(12) United States Patent
Yamada et al.

(10) Patent No.: US 7,602,969 B2
(45) Date of Patent: Oct. 13, 2009

(54) IMAGING DATA PROCESSING METHOD, IMAGING DATA PROCESSING DEVICE, AND COMPUTER PROGRAM

(75) Inventors: Rui Yamada, Kanagawa (JP); Mitsuharu Ohki, Tokyo (JP)

(73) Assignee: Sony Corporation, Tokyo (JP)

( * ) Notice: Subject to any disclaimer, the term of this patent is extended or adjusted under 35 U.S.C. 154(b) by 819 days.

(21) Appl. No.: 10/521,623

(22) PCT Filed: Jun. 19, 2003

(86) PCT No.: PCT/JP03/07778

§ 371 (c)(1),
(2), (4) Date: Jan. 14, 2005

(87) PCT Pub. No.: WO2004/010711

PCT Pub. Date: Jan. 29, 2004

(65) Prior Publication Data

US 2005/0243175 A1    Nov. 3, 2005

(30) Foreign Application Priority Data

Jul. 18, 2002 (JP) .............................. 2002-209743

(51) Int. Cl.
*G06K 9/00* (2006.01)

(52) U.S. Cl. .................. 382/167; 382/162; 382/274; 382/312; 358/479; 348/207.1

(58) Field of Classification Search .............. 382/162, 382/164, 165, 166, 167, 254, 274, 312; 358/479; 348/223.1, 371, 207.1, 227.1
See application file for complete search history.

(56) References Cited

U.S. PATENT DOCUMENTS 5,568,194 A * 10/1996 Abe .................. 348/223.1

5,808,681 A    9/1998 Kitajima
7,002,624 B1   2/2006 Uchino et al.

(Continued)

FOREIGN PATENT DOCUMENTS

JP    8-51632    2/1996

(Continued)

OTHER PUBLICATIONS

European Search Report mailed by the European Patent Office on Mar. 13, 2009 for counterpart Application No. 03765274.0, 5 pages.

*Primary Examiner*—Vikkram Bali
*Assistant Examiner*—Ali Bayat
(74) *Attorney, Agent, or Firm*—Finnegan, Henderson, Farabow, Garrett & Dunner, L.L.P.

(57) ABSTRACT

An accurate white balance adjustment process is provided for an image captured in an environment where different color components, such as an ambient light and a flash light are mixed. With respect to image to be captured under a plurality of different types of irradiation light, such as ambient light, and flash light, the image is captured or generated in an environment of single light irradiation. The white balance adjustment according to the parameter set up based on the color component (color temperature) of each type of irradiation light is carried out with respect to the image in each environment of the single light irradiation, so as to synthesize them Furthermore, with respect to the moved portion of the subject itself, the present invention is arranged such that the pixel value is compensated and set up based on adjacent pixel values of the motionless portion, it becomes possible to generate a natural image data with smooth changes between pixels.

24 Claims, 20 Drawing Sheets

U.S. PATENT DOCUMENTS

| | | | |
|---|---|---|---|
| 7,199,348 B2 * | 4/2007 | Olsen et al. | 250/208.1 |
| 2006/0054782 A1 * | 3/2006 | Olsen et al. | 250/208.1 |
| 2006/0250515 A1 * | 11/2006 | Koseki et al. | 348/362 |

FOREIGN PATENT DOCUMENTS

| | | |
|---|---|---|
| JP | 08-051632 | 2/1996 |
| JP | 08-340542 | 12/1996 |
| JP | 8-340542 | 12/1996 |
| JP | 2000-307940 | 11/2000 |
| JP | 2002-133395 | 5/2002 |
| JP | 2003-087644 | 3/2003 |
| JP | 2003-87644 | 3/2003 |

* cited by examiner

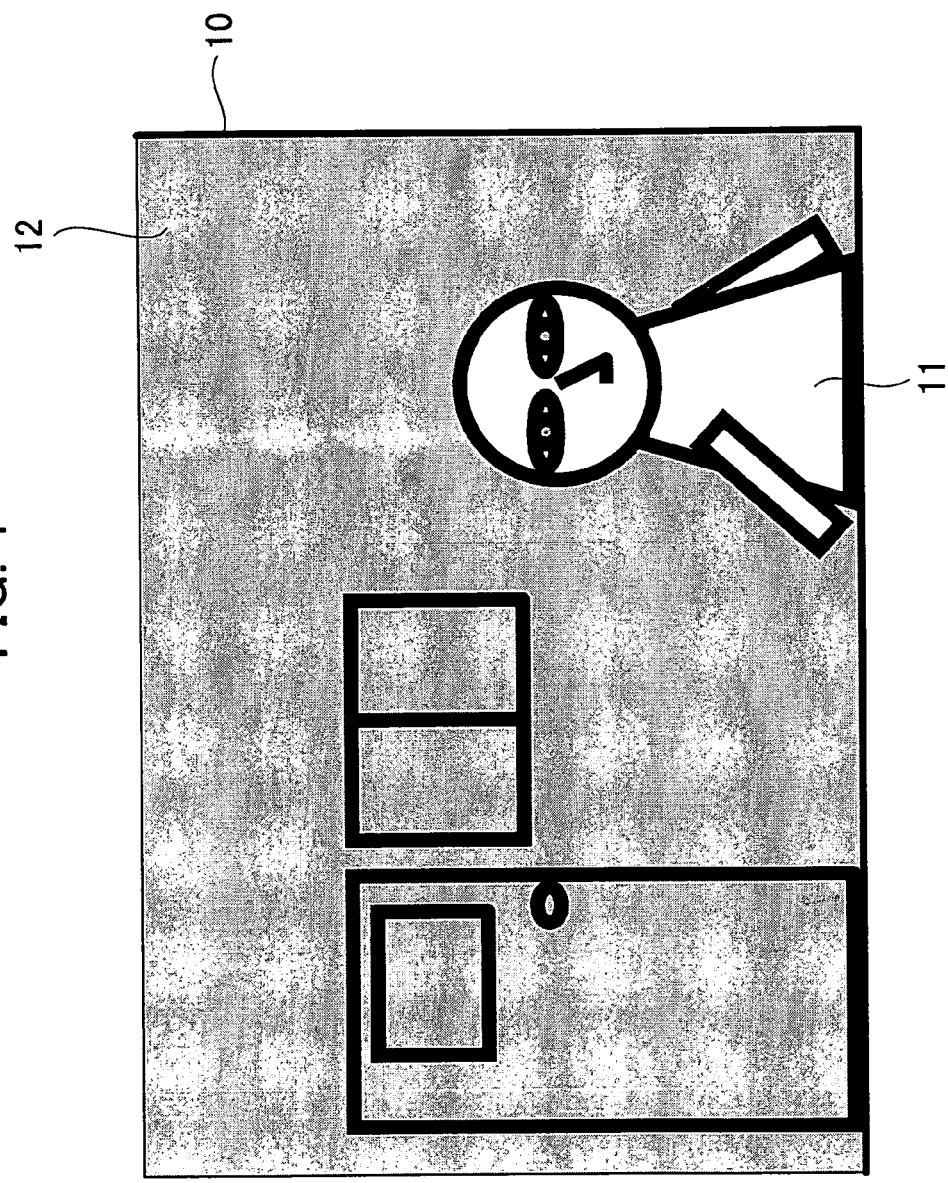

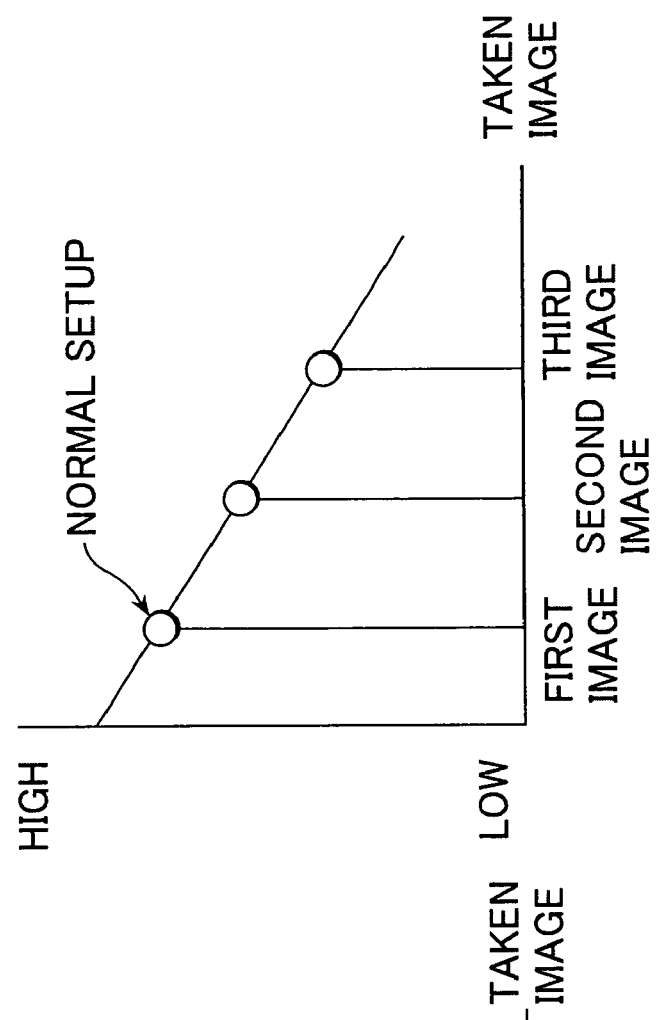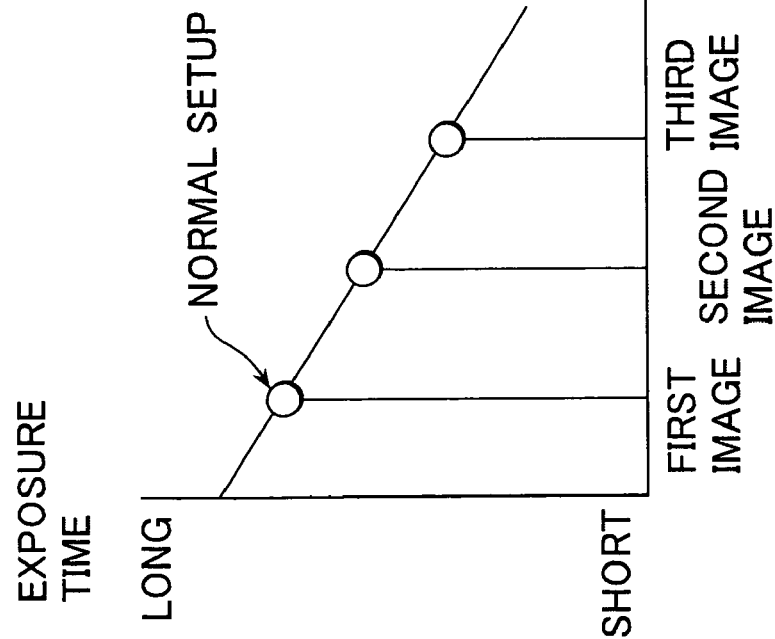

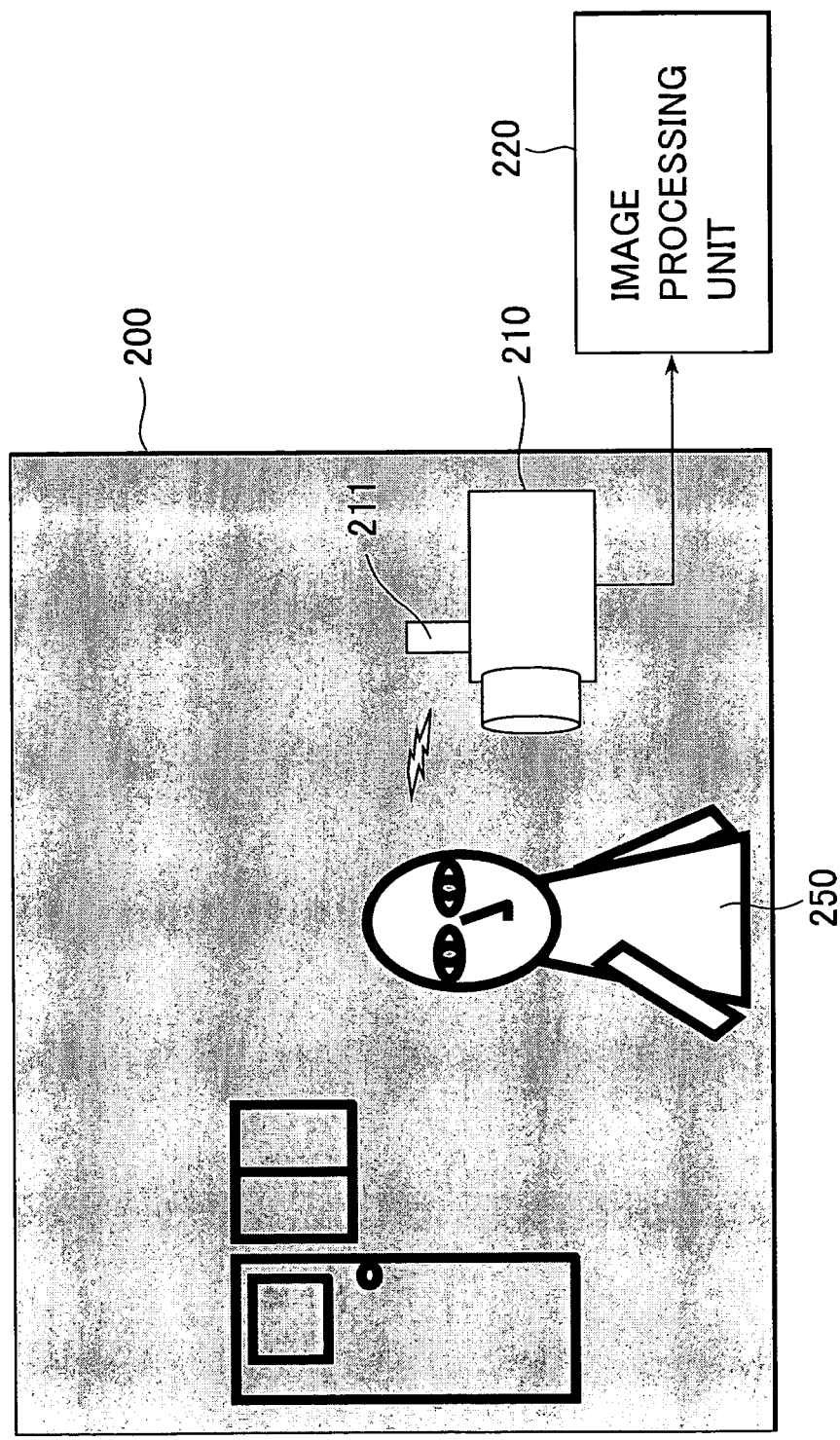

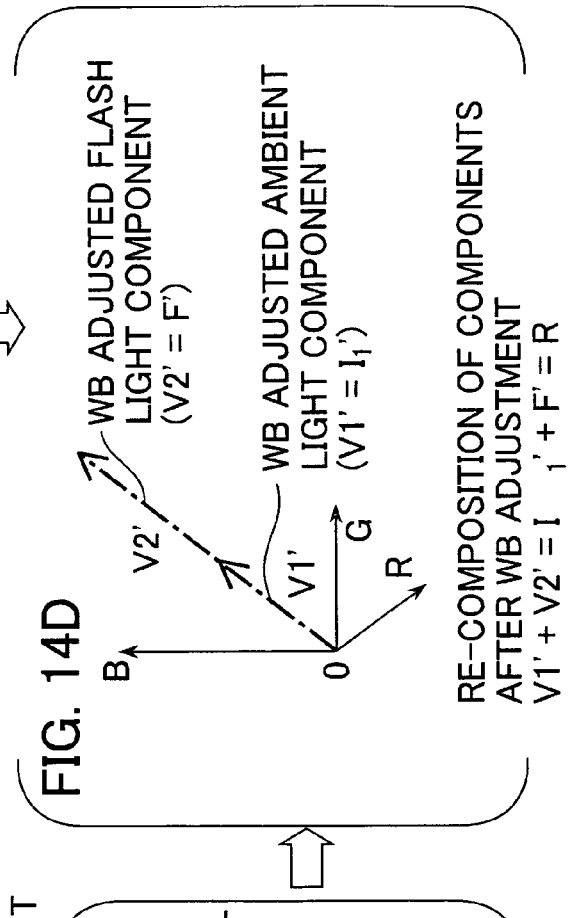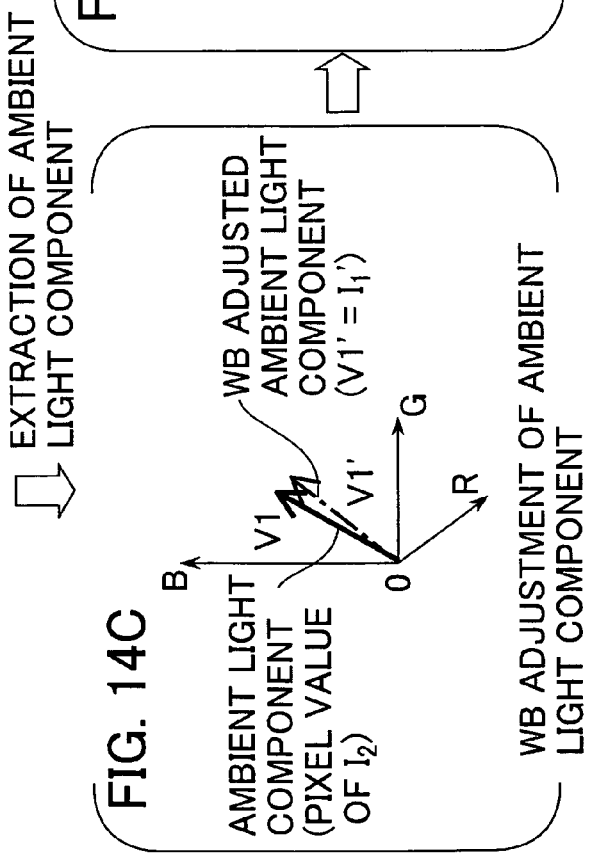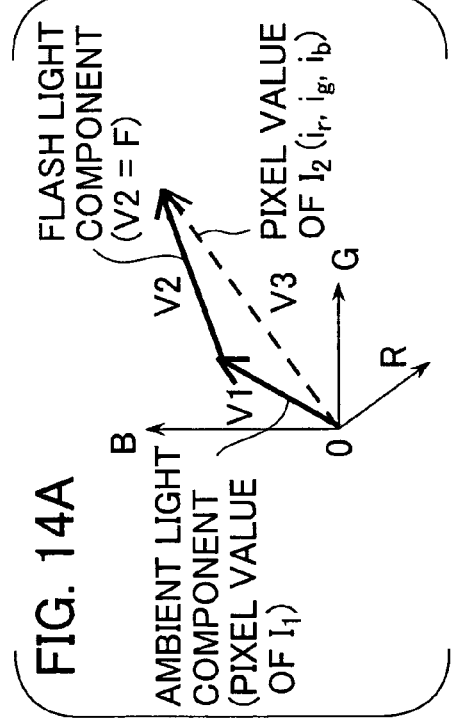

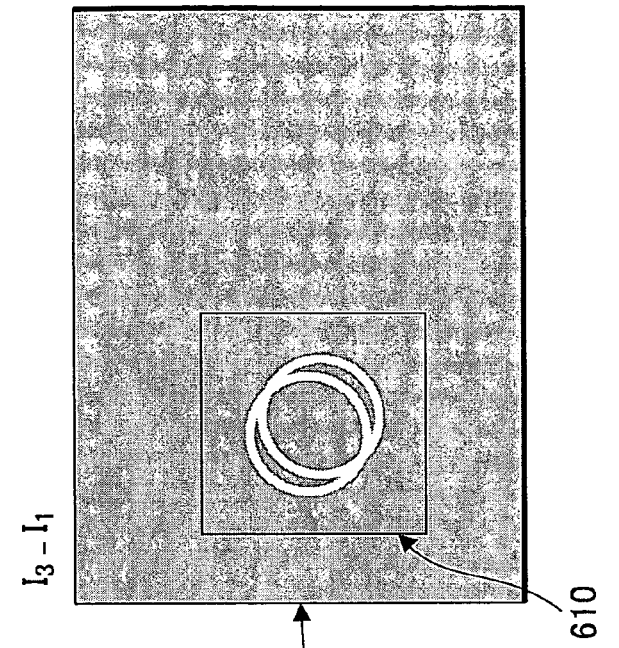
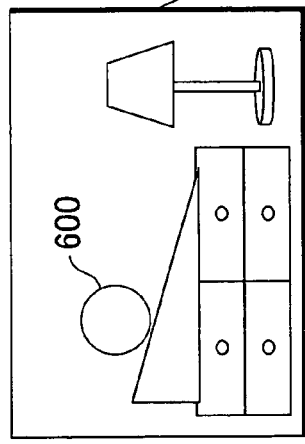
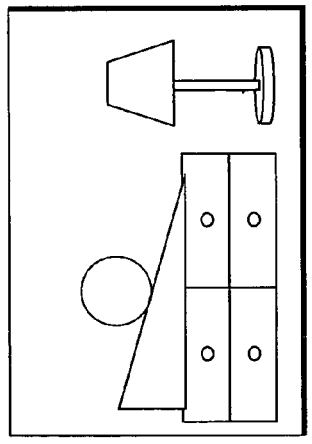
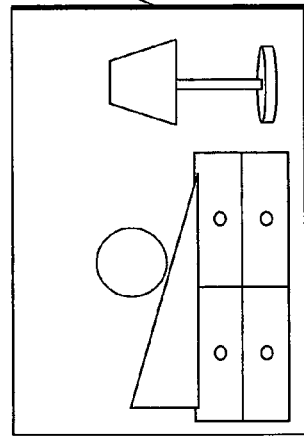
FIG. 15A  $I_1$
FIG. 15B  $I_2$
FIG. 15C  $I_3$
FIG. 15D  $I_3 - I_1$

IMAGING DATA PROCESSING METHOD, IMAGING DATA PROCESSING DEVICE, AND COMPUTER PROGRAM

TECHNICAL FIELD

The present invention relates to an image data processing method, and an image data processing apparatus, and a computer program, more particularly to an image data processing method, and an image data processing apparatus, and a computer program which realizes a suitable white balance process, and obtains clear image.

A flash (an electrical flash, a stroboscope) is used as an auxiliary light source when capturing image with a camera A DSC (Digital Still Camera) has become popular quickly in recent years, and flash imaging is often performed also with the DSC. By using the flash, various imaging processes can be performed, such as fill-in light (technique which weakens a shadow when the shadow is strongly accentuated on a person's face), backlighting compensation (technique which avoids a dark exposure such as a case where a photo is taken with the sun in the background), catch light (technique which introduces "a point of light" to shine in a eye's pupil so that the pupil is depicted having beautiful appearance), daylight synchronization (daylight synchronization; technique of using auxiliary rays during daytime or in the evening). On the other hand, when the flash imaging is performed, color unbalance or whitening may arise. An aim of the present invention is to provide a suitable means capable of correcting an undesired phenomenon which is produced in such flash imaging.

In generally, a digital camera provides a white balance (WB) adjustment so that a white subject may be captured as white. For example, when the imaging is carried out in a light component situation where the light for irradiating a subject with natural light, illumination light, and a flash (strobe light) etc. has a high color temperature and a strong blue (B) light component, the white balance is adjusted to restrain sensitivity to blue light and to make sensitivity to red light of (R) relatively high, and, on the contrary, when the imaging is carried out in a light component situation where the light for irradiating the subject has a low color temperature and a strong red (R) light, the white balance is adjusted to restrain sensitivity to red light and to make sensitivity to blue light (B) relatively high.

The white balance adjustment is usually such that an adjusting process is carried out in which an adjustment parameter according to a light source used at the time of imaging is set up. For example, when performing flash imaging, the white balance adjustment is performed according to the parameter corresponding to the light components which a flash light to be used has.

However, in a situation where there is ambient light other than the flash light, when the flash imaging is performed, two types of light, the flash light and ambient light, are irradiated onto the subject, so that reflected light reaches an image element of the camera, and then the imaging is performed. When such imaging is carried out, if the white balance adjustment is performed according to the flash light, then a portion of the subject irradiated with more of the flash light is adjusted to a natural color. However, in an area where the flash light does not reach and the imaging is carried out only by means of the reflected ambient light, for example, a background image area etc., if the white balance adjustment according to a parameter setup in accordance with the light components of the flash light is performed, then the white balance adjustment is not suitably carried out, so that the area may be outputted as an area having an unnatural color.

In contrast, if the white balance adjustment of the whole captured image is performed, considering that the white balance adjustment is performed in accordance with the background portion, i.e., the imaging is carried out only by ambient light, and then a portion where there is much flash light is adjusted to an unnatural color.

In order to cope with such problems, several structures are proposed. For example, Japanese Patent Application Publication No. 8-51632 discloses a structure in which an image captured without firing a flash light and an image captured by firing the flash light are obtained, these two captured images are divided into blocks, a brightness value for each block is compared, and based on the comparison result of the brightness value, the white balance adjustment which differs for each block is carried out with respect to the captured image by firing the flash light.

The white balance adjustment is performed by selecting either the white balance adjustment in accordance with the flash light for each block the white balance adjustment in accordance with the middle of the flash light and ambient light, or the white balance adjustment in accordance with ambient light However, with such a structure, it is necessary to carry out a process on a per block basis, so that there is a problem in that the process cannot be carried out accurately when a block distortion takes place, the subject moves, etc.

Japanese Patent Application Publication No. 2000-308068 discloses the following process structure, in which the imaging is carried out by firing the flash light in such a way that an aperture is fully opened, an exposure time is shorted, and then the imaging is carried out without firing the flash light in an originally desired exposure condition. Here, the former is regarded as a first image, and the latter is regarded as a second image. Further, in the first image, a pixel of more than a predetermined level is registered as a main subject area, and the other is registered as a background area. Then, the first image is subjected to the white balance adjustment according to the flash light, the second image is subjected to the white balance adjustment according to ambient light, then the main subject area of the first image and the background area of the second image are combined together so as to be the last recorded image.

However, in this structure it is not possible to correctly perform the white balance adjustment for the subject irradiated with both ambient light and the flash light.

Further, in addition to the structure of the above-mentioned Japanese Patent Application Publication No. 2000-308068, Japanese Patent Application Publication No. 2000-307940 discloses a structure to which an image blur detection means is added. When it is determined that there is a blur, the above-mentioned first image is made into a record image as it is so as not to perform a process of combining the first image and the second image. Therefore, when the blur is detected, the unnaturalness resulting from the difference in color temperature between the flash light and ambient light will not be eliminated.

Further, Japanese Patent Application Publication No. H8-340542 discloses a structure in which a division is carried out between brightness values of corresponding pixels of the images captured by firing the flash light and without firing the flash light so as to obtain a contribution ratio of the flash light, then based on this contribution ratio, the white balance adjustment is performed with respect to the image captured by firing the flash light.

However, in this structure, to the image captured by means of a mixture of the reflected flash light and ambient light, a white balance parameter is simply interpolated for the flash light and ambient light, based on the contribution ratio of the flash light, so as to generate the last image. However, when considering a reflected model of a physical light a component of the flash light and a component of ambient light should be processed independently, and it is impossible to generate the optimal resulting image only by processing the image captured by means of a mixture of the flash light and the reflected ambient light.

Recent cameras exchange information between a stroboscope which is a mechanism to fire the flash light and an imaging unit of the camera, and causes the stroboscope to emit an accurate light quantity so that the camera can carry out the imaging with an accurate exposure. This system is referred to as a TTL (through the lens) automatic exposure control system, and such technology is widely used.

FIG. 1 shows an example of a typical photograph 10 which images a person figure in a dark room by using the stroboscope in such a case. A projection image of a person A is 11. A projection image in a dark room is 12 A situation when taking this photo is as follows. The person A was in the dark room. An imager carried a camera with the stroboscope and took the photo near the person A.

During the imaging, the TTL automatic exposure control system accumulates and measures a quantity of each light which is emitted from the stroboscope and reflected by a target object, then returns to the camera At the timing of measuring an accurate quantity of light, the camera instructs the stroboscope side to stop emission of light, whereby an image of an accurate expose can be obtained.

However, like the photograph as shown in FIG. 1, when the projection image 11 of the person A is small, most light emitted from the stroboscope is not irradiated onto the person A, but reflected by a room wall located in a relatively distant position. Therefore, the quantity of the returned light is small, so that the TTL automatic exposure control system determines that the quantity of light is insufficient, and adjusts the quantity of emitting light from the stroboscope to be increased.

As a result of this adjusting process, the quantity of the strobe light at the time of imaging increases, so that the total quantity of the light reflected, with respect to the strobe light, by the person A who is immediately dose to the imaging apparatus (camera) increases considerably, whereby a value of the pixel data of the projection image portion of the person A is excessively high and in a saturation state.

By using numerical values, the pixel data are shown as follows. Although a method is common in which each of red (R), green (G) and blue (B) of each pixel data is represented by 256 (0-255) scales, the person A (especially a beige portion, such as a face) is represented by (R, G, B)=(255, 255, 255) in the above-mentioned example. This is because the flash light by means of the stroboscope is irradiated too much onto the person A, who stands in the close proximity to the camera.

In other words, this is because the quantity of the strobe light is high, so that the R component in the total amount of light reflected by the person A exceeds 255, the G component exceeds 255, and the B component also exceeds 255. (R, G, B)=(255, 255, 255) represents the brightest white. This is the so-called "whitening." The projection image of the person A's face is not beige but pure white.

The pixel data acquired as (R, G, B)=(255 or more, 255 or more, 255 or more) may each have different hues in fact However, the light is excessively irradiated onto the subject, so that they may be collectively represented as (R, G, B)= (255, 255, 255), and become pure white.

There is a technique described in Japanese Patent Application Publication No. 2000-278598 as a structure to solve such a problem of the so-called "whitening". This Patent Application Publication discloses a structure of a process of compensating a shift in an image signal having high brightness in an overexposed image. In particular, this is configured to generally shift conversion characteristic curves of a brightness level of an input signal and a brightness level of an output signal, so as to adjust a high brightness portion of the output signal, i.e., to compensate the high brightness portion by a gamma correction table.

However, even if the technique described in Japanese Patent Application Publication No. 2000-278598 is applied, every input signal having (R, G, B)=(255, 255, 255) is converted into a certain setup output value. In other words, in fact, a pixel data having (R, G, B)=(255 or more, 255 or more, and 255 or more) always has the same value, where the problem of the above-mentioned "whitening" cannot be solved. In other words, a subject image which should have various pixel values is set as the same color or brightness, so that distribution of the subject's color or brightness cannot be reproduced.

DISCLOSURE OF THE INVENTION

In view of the above-mentioned problems in related art, the present invention is invented and provides an image data processing method, an image data processing apparatus, and a computer program, which allow an optimal white balance adjustment for an image captured in circumstances where an ambient light and a flash light are mixed together, and allow an optimal white balance adjustment, without failing even when an image blur is detected.

Furthermore, in a structure to perform light irradiation onto the subject so as to be captured, the present invention provides an image data processing method, an image data processing apparatus, and a computer program which solve a problem that the subject is in the dose proximity to the imaging apparatus and the quantity of the irradiation light onto the subject becomes excessive, so that the values (R, G, B) of the subject image are saturated to be the brightest white, and an image reproducing a accurate color and brightness can be generated even for an excessively irradiated subject.

A first aspect of the present invention is an image data processing method characterized by:

a step of subtracting, from a pixel value of each pixel which constitutes a second image data acquired by way of an imaging process causing a first light source to emit light, a pixel value of a corresponding pixel of first image data acquired by way of an imaging process causing the aforementioned first light source not to emit light, so as to obtain a difference image data corresponding to an image captured in an irradiation environment of the aforementioned first light source only;

a difference image data pixel value adjustment processing step of performing a pixel value adjustment process with respect to the aforementioned difference image data; and a final pixel value adjustment image generation step of using an image data of adjusted pixel values generated in the aforementioned difference image data pixel value adjustment process step, so as to generate a final pixel value adjustment image.

Further, according to a preferred embodiment of the image data processing method of the present invention, the aforementioned image data processing method is characterized by further including a first image data pixel value adjustment processing step of performing the pixel value adjustment process with respect to the aforementioned first image data, wherein the aforementioned final pixel value adjustment image generation step is a step of performing a pixel value addition process for the corresponding pixels of two image data of adjusted pixel values acquired by the aforementioned difference image data pixel value adjustment processing step and the aforementioned first image data pixel value adjustment processing step, so as to generate a final pixel value adjustment image data.

Further, according to a preferred embodiment of the image data processing method of the present invention, the aforementioned pixel value adjustment process is a white balance adjustment process, the aforementioned difference image data pixel value adjustment processing step is a white balance adjustment process according to a parameter set up based on an light component of the aforementioned first light source, and the aforementioned first image data pixel value adjustment processing step is a white balance adjustment process according to a parameter set up based on an ambient light component which does not contain the aforementioned first light source.

Furthermore, according to a preferred embodiment of the image data processing method of the present invention, the aforementioned parameter is a parameter represented by a 3×3 matrix, and a matrix applied to conversion of color components which constitute a color of each pixel.

Furthermore, according to a preferred embodiment of the image data processing method of the present invention, the aforementioned 3×3 matrix is a matrix set as 0 with exception to diagonal components.

Furthermore, according to a preferred embodiment of the image data processing method of the present invention, the aforementioned image data processing method is characterized by further including a pixel value addition step of adding a pixel value of each pixel of the image data of adjusted pixel values generated in the aforementioned difference image data pixel value adjustment processing step to a pixel value of a corresponding pixel of the aforementioned first image data, wherein the aforementioned final pixel value adjustment image generation step is a step of performing the pixel value adjustment with respect to the image data generated in the aforementioned pixel value addition step, so as to generate the final pixel value adjustment image data.

Furthermore, according to a preferred embodiment of the image data processing method of the present invention, the aforementioned pixel value adjustment process is the white balance adjustment process, and the aforementioned difference image data pixel value adjustment processing step is the white balance adjustment process according to the parameter set up based on ambient light component which does not contain the aforementioned first light source.

Furthermore, according to a preferred embodiment of the image data processing method of the present invention, the aforementioned data processing method is characterized by further including a motion detecting step of detecting a moving portion where a subject moves according to the difference data of a plurality of image data, and a moving portion pixel value adjustment step of performing the pixel value adjustment process with respect to the aforementioned moving portion.

Further, according to a preferred embodiment of the image data processing method of the present invention, the aforementioned moving portion pixel value adjustment step is characterized by: a step of calculating a light intensity scalar ratio of two light sources when the aforementioned first light source is caused or not caused to emit light, as data corresponding to a pixel of a motionless portion adjacent to a moving portion; a step of using a radial basis function (RBF: Radial Basis Function) so as to calculate the light intensity scalar ratio corresponding to each pixel of the moving portion; a first pixel value calculation step of calculating the pixel value, as the first pixel value, of each pixel of the moving portion in an image which is equivalent to the image captured in an irradiation environment of the aforementioned first light source only, based on the light intensity scalar ratio corresponding to each pixel of the moving portion; a second pixel value calculation step of calculating the pixel value, as the second pixel value, of each pixel of the moving portion in an image which is equivalent to the image captured in an ambient light irradiation environment where the aforementioned first light source is not included, based on the light intensity scalar ratio corresponding to each pixel of the moving portion; a first pixel value adjustment processing step of performing the pixel value adjustment process, based on the first pixel value calculated in the aforementioned first pixel value calculation step; a second pixel value adjustment processing step of performing the pixel value adjustment process, based on the second pixel value calculated in the aforementioned second pixel value calculation step; and a pixel value addition step of adding two adjustment pixel values generated in the aforementioned first pixel value adjustment processing step and the second pixel value adjustment processing step.

Further, according to a preferred embodiment of the image data processing method of the present invention, the aforementioned pixel value adjustment process is the white balance adjustment process, the aforementioned first pixel value adjustment processing step is the white balance adjustment process according to the parameter set up based on the aforementioned light component of the first light source, and the aforementioned second pixel value adjustment processing step is the white balance adjustment process according to the parameter set up based on ambient light component which does not contain the aforementioned first light source.

Further, according to a preferred embodiment of the image data processing method of the present invention, the aforementioned moving portion pixel value adjustment step is characterized by further including: a step of calculating a color component ratio $(\alpha_r, \alpha_g, \alpha_b)$ of a pixel value of an inner peripheral pixel of the moving portion to an average pixel value of outer peripheral pixels of the moving portion adjacent to the inner peripheral pixel of the moving portion; a step of constructing the radial basis function (RBF: Radial Basis Function) based on the color component ratio corresponding to each pixel by considering all the inner peripheral pixels in the moving portion as sample points; and a step of calculating the color component ratio corresponding to each pixel of the moving portion, based on the aforementioned radial basis function (RBF), and multiplying the color component ratio with an image to be compensated so as to obtain a compensation pixel value.

Further, according to a preferred embodiment of the image data processing method of the present invention, the aforementioned image data processing method is characterized by further including a motion detecting step of detecting a moving portion where a subject moves according to the difference data of a plurality of image data, and a step of performing the pixel value adjustment process based on the second image data acquired by way of an imaging process causing the aforementioned first light source to emit light when a proportion of the whole image of the aforementioned moving portion is larger than a predetermined threshold value, wherein the pixel value adjustment data based on the second image data is set up as a final pixel value adjustment data.

Furthermore, according to a preferred embodiment of the image data processing method of the present invention, the pixel value adjustment process based on the aforementioned second image data is characterized by being either the white balance adjustment process according to the parameter set up based on the light component of the aforementioned first light source, the white balance adjustment process according to the parameter set up based on ambient light component not containing the aforementioned first light source, or the white balance adjustment process according to the parameter set up based on an intermediate light component between the aforementioned first light source and ambient light component not containing the aforementioned light component of the first light source.

Further, a second aspect of the present invention is an image data processing apparatus characterized by:

a memory for storing first image data acquired by way of an imaging process causing the first light source not to emit light, and a second image data acquired by way of an imaging process causing the aforementioned first light source to emit light; and a data processing unit for performing a pixel value adjustment process based on the image data stored in the aforementioned memory, wherein the aforementioned data processing unit has:

a difference image data acquisition unit for subtracting, from a pixel value of each pixel which constitutes the aforementioned second image data, a pixel value of a corresponding pixel of the aforementioned first image data, so as to acquire the difference image data corresponding to the image captured in an irradiation environment of the aforementioned first light source only;

a difference image data pixel value adjustment unit for performing the pixel value adjustment process with respect to the lo aforementioned difference image data; and a final pixel value adjustment unit for performing a final pixel value adjustment by using a image data of adjusted pixel values generated in the aforementioned difference image data pixel value adjustment unit.

Further, according to a preferred embodiment of the image data processing apparatus of the present invention, the aforementioned data processing unit further includes first image data pixel value adjustment unit for performing the pixel value adjustment process with respect to the aforementioned first image data, and the aforementioned final pixel value adjustment unit is arranged to perform the pixel value addition process for corresponding pixels of two image data of adjusted pixel values generated in the aforementioned difference image data pixel value adjustment unit and the aforementioned first image data pixel value adjustment unit, so as to generate the final pixel value adjustment image data.

Further, according to a preferred embodiment of the image data processing apparatus of the present invention, the aforementioned pixel value adjustment process is the white balance adjustment process, the aforementioned difference image data pixel value adjustment unit is arranged to perform the white balance adjustment process according to the parameter set up based on the light component of the aforementioned first light source, and the aforementioned first image data pixel value adjustment unit is arranged to perform the white balance adjustment process according to the parameter set up based on ambient light component not including the aforementioned first light source.

Further, a preferred embodiment of the image data processing apparatus of the present invention, the aforementioned data processing unit further includes a pixel value adding unit for adding a pixel value of each pixel of the image data of adjusted pixel values generated in the aforementioned difference image data pixel value adjustment unit to a pixel value of a corresponding pixel of the aforementioned first image data, and the aforementioned final pixel value adjustment image generating unit performs the pixel value adjustment with respect to the image data generated in the aforementioned pixel value adding unit, so as to generate the final pixel value adjustment image data.

Furthermore, according to a preferred embodiment of the image data processing apparatus of the present invention, the aforementioned pixel value adjustment process is the white balance adjustment process, and the aforementioned difference image data pixel value adjustment unit performs the white balance adjustment process according to the parameter set up based on ambient light component not including the aforementioned first light source.

Furthermore, according to a preferred embodiment of the image data processing apparatus of the present invention, the aforementioned data processing unit is characterized by further including a motion detection unit for detecting a moving portion of a subject based on the difference data of a plurality of image data, and a moving portion pixel value adjustment unit for performing the pixel value adjustment process with respect to the aforementioned moving portion.

Further, according to a preferred embodiment of the image data processing apparatus of the present invention, the aforementioned moving portion pixel value adjustment unit is characterized by calculating a light intensity scalar ratio of two light sources when the aforementioned first light source is caused or not caused to emit light, as data corresponding to a pixel of a motionless portion adjacent to a moving portion; using a radial basis function (RBF: Radial Basis Function) so as to calculate the light intensity scalar ratio corresponding to each pixel of the moving portion; based on the light intensity scalar ratio corresponding to each pixel of the moving portion, calculating the pixel value, as the first pixel value, of each pixel of the moving portion in an image which is equivalent to the captured image in an irradiation environment of the aforementioned first light source only; based on the light intensity scalar ratio corresponding to each pixel of the moving portion, calculating the pixel value, as the second pixel value, of each pixel of the moving portion in an image which is equivalent to the captured image in an ambient light irradiation environment where the aforementioned first light source is not included; based on the aforementioned first pixel value, performing the pixel value adjustment process; based on the aforementioned second pixel value, performing the pixel value adjustment process; and adding the generated two adjustment pixel values, so as to perform a moving portion pixel value adjustment process.

Further, according to a preferred embodiment of the image data processing apparatus of the present invention, the aforementioned pixel value adjustment process is the white balance adjustment process, the aforementioned first pixel value adjustment process is carried out as the white balance adjustment process according to the parameter set up based on the light component of the aforementioned first light source, and the aforementioned second pixel value adjustment process is performed as the white balance adjustment process according to the parameter set up based on ambient light component not including the aforementioned first light source.

Further, according to a preferred embodiment of the image data processing apparatus of the present invention, the aforementioned moving portion pixel value adjustment unit is characterized by calculating the color component ratio ($\alpha_r$, $\alpha_g$, $\alpha_b$) of the pixel value of an inner peripheral pixel of the moving portion to an average value of the pixel value of an outer peripheral pixel of the moving portion adjacent to the inner peripheral pixel of the moving portion, constructing a radial basis function (RBF: Radial Basis Function) based on the color component ratio corresponding to each pixel by considering all the inner peripheral pixels in the moving portion as sample points, calculating the color component ratio corresponding to each pixel of the moving portion based on the aforementioned radial basis function (RBF), and multiplying the color component ratio with an image to be compensated, so as to obtain a compensation pixel value.

Further, according to a preferred embodiment of the image data processing apparatus of the present invention, the aforementioned data processing unit is characterized by performing the pixel value adjustment process based on the second image data acquired by way of an imaging process causing the aforementioned first light source to emit light when a proportion of the whole image of the aforementioned moving portion detected by the aforementioned motion detection unit is larger than a predetermined threshold value, so that the pixel value adjustment data based on the aforementioned second image data is set up as the final pixel value adjustment data.

Furthermore, according to a preferred embodiment of the image data processing apparatus of the present invention, the pixel value adjustment process based on the aforementioned second image data is characterized by performing either the white balance adjustment process according to the parameter set up based on the light component of the aforementioned first light source, the white balance adjustment process according to the parameter set up based on ambient light component not including the aforementioned first light source, or the white balance adjustment process according to the parameter set up based on an intermediate light component between the light component of the aforementioned fist light source and ambient light component not including the aforementioned first light source.

Furthermore, a third aspect of the present invention is an image data processing method characterized by:

a step of acquiring first image data by way of an imaging process causing the first light source not to emit light;

a step of acquiring a second image data by way of an imaging process causing the aforementioned first light source to emit light;

a step of subtracting, from a pixel value of each pixel which constitutes the aforementioned second image data, a pixel value of a corresponding pixel of the aforementioned first image data, so as to acquire a difference image data corresponding to the image captured in an irradiation environment of the aforementioned first light source only;

a difference image data pixel value adjustment processing step of performing the pixel value adjustment process with respect to the aforementioned difference image data; and a final pixel value adjustment image generation step of generating a final pixel value adjustment image by using the adjusted pixel value image data generated in the aforementioned difference image data pixel value adjustment processing step.

Furthermore, a fourth aspect of the present invention is the image data processing method characterized by:

a step of acquiring a plurality of image data captured at mutually different times in a situation where light-emitting conditions of the first light source are the same;

a step of acquiring motion information based on comparison among the aforementioned plurality of image data; and a step of performing a process according to the white balance set up based on the aforementioned motion information, with respect to either one of the aforementioned plurality of image data, a part thereof, all of them, or other image data.

Furthermore, according to a preferred embodiment of the image data processing method of the present invention, in the step of performing the process according to the white balance set up based on the aforementioned motion information, with respect to the other image data captured during a period when the aforementioned plurality of image data are captured, immediately before or immediately after the aforementioned plurality of image data are captured, the white balance of a corresponding portion is adjusted.

Furthermore, according to a preferred embodiment of the image data processing method of the present invention, when it is determined that a motion is large based on the aforementioned motion information, the white balance adjustment process is carried out based on ambient light, the flash, or a virtual light source intermediate ambient light and the flash, in the step of performing the process according to the white balance set up based on the aforementioned motion information.

Furthermore, according to a preferred embodiment of the image data processing method of the present invention, the step of performing the white balance treatment process set up based on the aforementioned motion information is characterized by further including a step of adaptively switching the white balance adjustment processes for each portion of the image, instead of an uniform process for the whole image, wherein, further, based on the aforementioned motion information, the image is interpolated from the image data of a still portion adjacent to a corresponding portion so as to obtain the image data of the corresponding portion.

Furthermore, a fifth aspect of the present invention is an image data processing apparatus is characterized by:

imaging means for acquiring a plurality of image data by way of an imaging process causing a first light source not to emit light and an imaging process causing the aforementioned first light source to emit light;

a memory for storing first image data acquired by way of the imaging process causing the aforementioned first light source not to emit light and a second image data acquired by way of the imaging process causing the aforementioned first light source to emit light; and a data processing unit for performing a pixel value adjustment process based on the image data stored in the aforementioned memory, wherein the aforementioned data processing unit includes:

a difference image data acquisition unit for subtracting, from a pixel value of each pixel which constitutes the aforementioned second image data, a pixel value of a corresponding pixel of the aforementioned first image data, so as to acquire a difference image data corresponding to the image captured in an irradiation environment of the aforementioned first light source only;

a difference image data pixel value adjustment unit for performing a pixel value adjustment process with respect to the aforementioned difference image data; and a final pixel value adjustment unit for performing a final pixel value adjustment by using an image data of adjusted pixel values generated in the aforementioned difference image data pixel value adjustment unit.

Furthermore, a sixth aspect of the present invention is an image data processing apparatus characterized by:

means for acquiring a plurality of image data captured at mutually different times in a situation where light-emitting and imaging conditions of the first light source are the same;

means for acquiring motion information based on a comparison among the aforementioned plurality of image data; and means for performing a process according to the white balance set up based on the aforementioned motion information, with respect to either one of the aforementioned plurality of image data, a part thereof, all of them, or other image data.

Furthermore, a seventh aspect of the present invention is a computer program for executing a process for image data, the computer program being characterized by:

a step of acquiring first image data by way of an imaging process causing a first light source not to emit light;

a step of acquiring a second image data by way of an imaging process causing the aforementioned first light source to emit light;

a step of subtracting, from a pixel value of each pixel which constitutes the aforementioned second image data, a pixel value of a corresponding pixel of the aforementioned first image data, so as to acquire a difference image data corresponding to the image captured in an irradiation environment of the aforementioned first light source only;

a difference image data pixel value adjustment processing step of performing a pixel value adjustment process with respect to the aforementioned difference image data; and a final pixel value adjustment image generation step of generating a final pixel value adjustment image by using the adjusted pixel value image data generated in the aforementioned difference image data pixel value adjustment processing step.

Furthermore, an eighth aspect of the present invention is an image data processing method for performing a pixel value compensation process with respect to an image data which has a saturation pixel value, the method being characterized by:

a temporary compensation pixel value calculation step of inputting a plurality of image data including first image data to be compensated and having a saturation pixel which at least a part of pixels in the image data is set up as a maximum pixel value, and one or more sub-image data captured under an exposure condition different from that for the first image data, acquiring an exposure condition difference data, based on mutually corresponding pixel value differences in a plurality of input image data, which indicates a difference in the exposure condition at a time of acquiring each image data, and calculating a temporary compensation pixel value of the saturation pixel in the aforementioned first image data, based on the exposure condition difference data; and a compensation pixel value calculation step of performing a normalization process for correcting the aforementioned temporary compensation pixel value to a pixel value within an outputable range.

Further, according to a preferred embodiment of the image data processing method of the present invention, the aforementioned first image data has the pixel values (Rc1, Gc1, Bc1) in the saturation pixel position (Xc, Yc), and is the image data which has the pixel values (Ru1, Gu1, Bu1) in the non-saturated pixel (Xu, Yu); the aforementioned sub-image data includes the second image data as a captured image of a lower intensity exposure than the aforementioned first image data, the third image data as the captured image of an exposure of still lower intensity than the second image data; the aforementioned temporary compensation pixel value calculation step performs a calculation process according to the following equations, assuming that the pixel value in the position corresponding to the non-saturated pixel (Xu, Yu) of the aforementioned first image data in the second image data and the third image data are (Ru2, Gu2, Bu2) and (Ru3, Gu3, Bu3), $$P(Xu, Yu) = \sqrt{\left(\frac{(Ru1-Ru3)}{(Ru2-Ru3)}\right)^2 + \left(\frac{(Gu1-Gu3)}{(Gu2-Gu3)}\right)^2 + \left(\frac{(Bu1-Bu3)}{(Bu2-Bu3)}\right)^2} \quad \text{(Equation 1)}$$

$$S = \frac{\sum P(Xu, Yu)}{n} \quad \text{(Equation 2)}$$

and calculates the exposure condition difference data :S based on the above (equation 1) and (equation 2).

Further, according to a preferred embodiment of the image data processing method of the present invention, the aforementioned compensation pixel value calculation step is characterized by further performing the calculation process according to the following equations, assuming that the pixel values of the position corresponding to the saturation pixel (Xc, Yc) of the aforementioned first image data in the second image data and the third image data are (Rc2 Gc2, Bc2) and (Rc3,Gc3, Bc3), $$Rcq=(Rc2-Rc3)\times S+Rc3$$

$$Gcq=(Gc2-Gc3)\times S+Gc3$$

$$Bcq=(Bc2-Bc3)\times S+Bc3 \quad \text{(Equation 3)}$$

and, based on the aforementioned (equation 3), calculating the temporary compensation pixel values (Rcq, Gcq, Bcq) of the saturation pixel in the aforementioned first image data.

Further, according to a preferred embodiment of the image data processing method of the present invention, the aforementioned compensation pixel value calculation step is characterized by calculating a maximum value: Dmax of all the data of pixel values (Ru, Gu, Bu) of the non-saturated pixel (Xu,Yu) of the aforementioned first image, and the aforementioned temporary compensation pixel values (Rcq, Gcq, Bcq) with respect to the saturation pixel (Xc, Yc), performing the calculation process according to the following equations, in the case of the non-saturated pixel (Xu, Yu), $$Ruf=Ru/D\text{max}$$

$$Guf=Gu/D\text{max}$$

$$Buf=Bu/D\text{max};$$

in the case of the saturation pixel (Xc, Yc), $$Rcf=Rcq/D\text{max}$$

$$Gcf=Gcq/D\text{max}$$

$$Bcf=Bcq/D\text{max} \quad \text{(equations 4)}$$

and, based on the aforementioned (equations 4), calculating the compensation pixel values (Ruf, Guf, Buf) of the non-saturated pixel of the aforementioned first image data and the compensation pixel values (Rcf, Gcf, Bcf) of the saturation pixel.

Further, according to a preferred embodiment of the image data processing method of the present invention, the difference in the exposure conditions between the aforementioned first image data and one or more sub-image data is a difference in irradiation light intensity, and the aforementioned temporary compensation pixel value calculation step calculates a ratio of amount of irradiation light based on the difference in the irradiation light intensity of a plurality of image data as the aforementioned exposure condition difference data.

Furthermore, according to a preferred embodiment of the image data processing method of the present invention, the difference in the exposure conditions between the aforementioned first image data and one or more sub-image data is the difference in exposure time, and the aforementioned temporary compensation pixel value calculation step calculates the ratio of irradiation light intensity based on the difference in the exposure time of a plurality of image data as the aforementioned exposure condition difference data.

Further, according to a preferred embodiment of the image data processing method of the present invention, the aforementioned temporary compensation pixel value calculation step and the aforementioned compensation pixel value calculation step are characterized by calculating a compensation data on each signal component of a color image in the aforementioned first image.

Furthermore, according to a preferred embodiment of the image data processing method of the present invention, the aforementioned temporary compensation pixel value calculation step and the aforementioned compensation pixel value calculation step are characterized by calculating the compensation data according to a luminance component in the aforementioned first image.

Furthermore, a ninth aspect of the present invention is an imaging method for capturing image data to be stored in a memory unit, the method being characterized by:

an imaging step of capturing image by setting up different exposure conditions;

a temporary compensation pixel value calculation step of inputting a plurality of image data including first image data to be compensated and having a saturation pixel which at least a part of pixels in the image data is set up as a maximum pixel value, and one or more sub-image data captured under an exposure condition different from that for the first image data, acquiring an exposure condition difference data, based on mutually corresponding pixel value differences in a plurality of input image data, which indicates a difference in the exposure condition at a time of acquiring each image data, and calculating a temporary compensation pixel value of the saturation pixel in the aforementioned first image data, based on the e condition difference data;

a compensation pixel value calculation step of performing a normalization process for correcting the aforementioned temporary compensation pixel value to a pixel value within an outputable range; and a store step of storing the image data constituted by the pixel value compensated by the aforementioned compensation pixel value calculation step.

Further, according to a preferred embodiment of the imaging method of the present invention, the difference between the aforementioned exposure conditions is a difference in irradiation light intensity, or a difference in exposure time, the aforementioned imaging step captures a plurality of image data under the different setup conditions of the irradiation light intensity or the exposure time, and the aforementioned temporary compensation pixel value calculation step calculates the ratio of irradiation light intensity based on the difference in the irradiation light intensity or the exposure time of the plurality of image data as the aforementioned exposure condition difference data.

Furthermore, a tenth aspect of the present invention is an image data processing apparatus for performing a pixel value compensation process with respect to an image data having a saturation pixel value, the image data processing apparatus being characterized by:

temporary compensation pixel value calculation means for inputting a plurality of image data including first image data to be compensated and having a saturation pixel which at least a part of pixels in the image data is set up as a maximum pixel value, and one or more sub-image data captured under an exposure condition different from that for the first image data, acquiring an exposure condition difference data, based on mutually corresponding pixel value differences in a plurality of input image data, which indicates a difference in the exposure condition at a time of acquiring each image data, and calculating a temporary compensation pixel value of the saturation pixel in the aforementioned first image data, based on the exposure condition difference data; and compensation pixel value calculation means for performing a normalization process for correcting the aforementioned temporary compensation pixel value to a pixel value within an outputable range.

Furthermore, an eleventh aspect of the present invention is a computer program for executing an image data process including a pixel value compensation process with respect to an image data which has a saturation pixel value, the computer program being characterized by:

a temporary compensation pixel value calculation step of inputting a plurality of image data including first image data to be compensated and having a saturation pixel which at least a part of pixels in the image data is set up as a maximum pixel value, and one or more sub-image data captured under an exposure condition different from that for the first image data, acquiring an exposure condition difference data, based on corresponding pixel value differences in a plurality of input image data, which indicates a difference in the exposure condition at a time of acquiring each image data, and calculating a temporary compensation pixel value of the saturation pixel in the aforementioned first image data, based on the exposure condition difference data; and a compensation pixel value calculation step of performing a normalization process for correcting the aforementioned temporary compensation pixel value to a pixel value within an outputable range.

According to the structures of the present invention, it is possible to suitably adjust the white balance with respect to the image captured in an environment where different light components, such as ambient light, flash light etc., are mixed, and to acquire the image data of natural tones.

Further, according to the structures of the present invention, since it is constructed such that, with respect to the image to be captured under a plurality of different types of irradiation light, such as ambient light, and flash light, the image is captured or generated in an environment of single light irradiation, the white balance adjustment according to the parameter set up based on the color component (color temperature) of each type of irradiation light is carried out with respect to the image in each environment of the single light irradiation, so as to synthesize the images, thereby realizing a suitable white balance adjustment process in which the difference in color temperature between the flash light and ambient light is reduced.

Furthermore, according to the structures of the present invention, since it is constructed such that, with respect to a moved portion of the subject itself, the pixel value is adjusted and set up based on the value of the pixel adjacent to the motionless portion, it becomes possible to generate a natural image data with a smooth change across pixels.

Furthermore, the structures of the present invention provide the suitable pixel value compensation with respect to the image data in which the pixel value of the subject image is saturated because the subject dose to the imaging means is excessively irradiated under the irradiation light, such as a stroboscope attached to the imaging means, such as a camera.

Further, according to the structures of the present invention, the temporary compensation pixel value of the saturation pixel value is obtained based on a plurality of image data under the different exposure conditions, and the temporary compensation pixel value is subjected to the normalization process so as to be corrected again to the outputable pixel value then outputted or recorded, whereby a clear image data can be outputted and stored based on an accurate compensation pixel value calculation and the compensation pixel value.

Furthermore, according to the structures of the present invention, a plurality of image data are inputted that include first image data to be compensated and having the saturation pixel which at least a part of pixels in the image data is set up as a maximum pixel value, and one or more sub-image data captured under an exposure condition different from that for the first image data; based on mutually corresponding pixel value differences in the plurality of input image data, the exposure condition difference data is acquired which indicates the difference in the exposure condition at the time of acquiring each image data; based on the exposure condition difference data, the temporary compensation pixel value of the saturation pixel in the aforementioned first image data is calculated; and the normalization process is carried out for correcting the aforementioned temporary compensation pixel value to a pixel value within an outputable range, thus outputting and storing a dear image data based on an accurate compensation pixel value calculation and the compensation pixel value.

In addition, the computer program in accordance with the present invention is a computer program which can be provided for a computer system which can perform various program codes, for example, by way of a storage medium provided in a computer-readable form, a communication medium, a storage medium, such as a CD, an FD, an MO, or a communication media, such as a network By providing such a program in a computer-readable form, a process according to the program is realized on a computer system.

Other aspects, features, and advantages of the present invention will be apparent from the following detailed description based on examples and the accompanying drawings of the present invention as described later. In addition, in this specification, a system means a logical collective structure of a plurality of devices, which are not always in a same casing.

BRIEF DESCRIPTION OF THE DRAWINGS

FIG. 1 is a view for explaining a problem of an image captured being irradiated with a stroboscope etc.;

FIGS. 2 are graphs for explaining exposure conditions of a plurality of images captured in an image processing apparatus of the present invention;

FIG. 4 is a view for explaining an example of image acquisition in the image processing apparatus of the present invention;

FIG. 14 is chart for explaining a principle of the white balance adjustment process based on a plurality of image data in the image data processing method of the present invention;

FIG. 15 is a view for explaining a detection process of a moving portion based on the plurality of image data in an imaged data process of the present invention;

BEST MODE FOR IMPLEMENTING THE INVENTION

Figure 3:
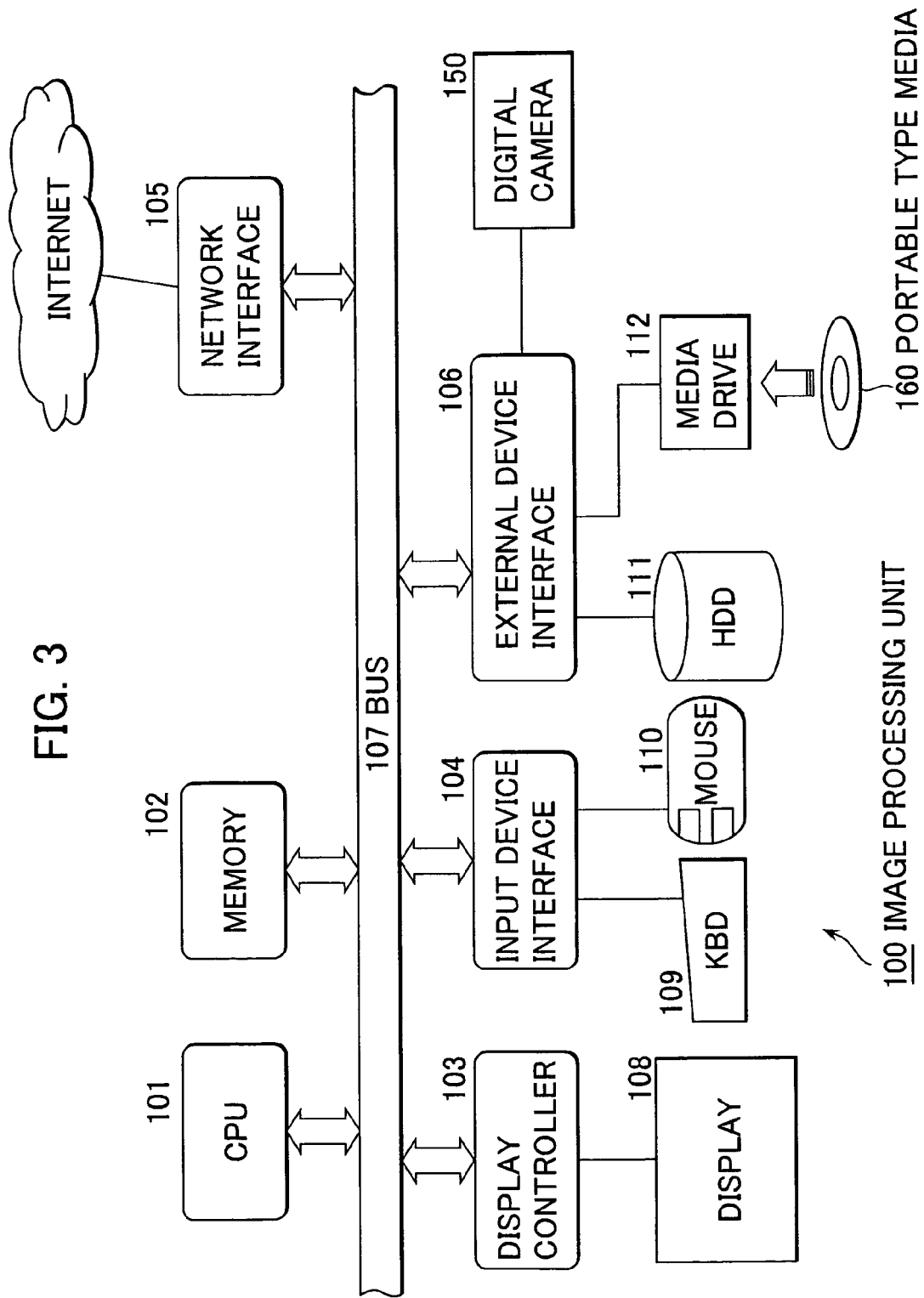
FIG. 3 is a diagram for explaining an example of a hardware structure of the image processing apparatus of the present invention.

Hereinafter, with reference to the drawings, an image data processing method, an imaging apparatus, and an apparatus and method for processing an image in accordance with the present invention will be described. The following two themes will be described in turn.

1. Compensation Process for Saturation Pixel Value Due to Excessive Light Irradiation 2. Optimal White Balance Adjustment Process of Imaging in Environment where Ambient Light and Flash Light are Mixed

[1. Compensation Process for Saturation Pixel Value Due to Excessive Light Irradiation]

Firstly, an outline of an image processing apparatus, and an imaging apparatus and method of the present invention for performing a compensation process for a saturation pixel value by excessive light irradiation will be described. In the present invention, at least three or more images captured in different imaging modes are captured. The imaging modes of the plurality of images are varied in exposure time and intensity of light to image, as shown in FIGS. 2(a) and (b). A first image is an image to be compensated, and second and third images are sub-images to be applied to compensation process for the first image.

Similar to a conventional manner, the first image to be subjected to the compensation process is exposed as an emission means, for example, a stroboscope, emits light Therefore, when the subjects to be image-captured exist both in a near position and a distant position with respect to the imaging apparatus, an excessive amount of light is irradiated onto the imaging subject located at a position close to the imaging apparatus, so that the values of (R, G, B) of the image (referred to as the first image) is saturated. In addition, in the following description, although the emission means is described as a stroboscope or a flash, the structure of the present invention can also be applied when the emission means utilizes not only the stroboscope, the flash, but also other different light irradiation means.

The second image as the sub-image is an image captured by setting the exposure time to a shorter period than that of the first image, or an image (referred to as the second image) captured in a situation where the intensity of light of the stroboscope is reduced to that at the time of imaging the first image.

Furthermore, the third image as the sub-image is an image captured by setting the exposure time to a much shorter period than that of the second image or an image (referred to as the third image) captured in a situation where the intensity of light of the stroboscope is still lower than that at the time of imaging the second image (or light is not emitted).

Since the second image and the third image have the less exposure time or the lower intensity of strobe light, the images become darker as a whole. Even if it is a subject dose to an imaging apparatus (camera), and in a short distance from a stroboscope as the light emission means, the intensity of irradiation light decreases, thus none of the pixels of the captured image are not saturated.

The second image and the third image are not used for viewing because they are dark images. However, they include useful information which is lost from the first image. That is, it is the information on a hue. In other words, a proportion of R:G:B in each pixel can be obtained from the second image and third image. From this information, the data (especially hue) of the saturated pixel in the first image is restored.

Hereinafter, a specific structure of the present invention will be described. Firstly, an example of hardware structure of an image processing apparatus of the present invention will be described with reference to FIG. 3. Each constituent element in an image processing apparatus 100 will be described referring to FIG. 3. In addition, the image processing apparatus 100 as shown in FIG. 3 can also be incorporated into the imaging apparatus (camera).

A CPU (Central Processing Unit) 101 which is a main controller for the image processing apparatus 100 executes various applications under control of an operating system (OS). The CPU 101 can execute an application program to compensate an image which is once downloaded from a digital camera 150 as an imaging means to a HDD 111 through an external device interface 106. As shown, the CPU 101 is interconnected to other devices by a bus 107.

A memory 102 is a storage device used for storing a program code executed in the. CPU 101 or for temporarily storing a running operation data. It should be understand that the memory 102 as shown in the figure includes both a nonvolatile memory, such as a ROM, and a volatile memory, such as a DRAM.

A display controller 103 is a dedicated controller for actually processing a drawing command issued by the CPU 101. A drawing data processed in the display controller 103 is outputted to a screen by a display 108, for example, after being once written in a frame buffer (not shown). For example, an image reproduced from the HDD (111) and an image processed by the CPU 101 are displayed on the display 108, so that a user can see it.

An input device interface 104 is a device for connecting a user input device, such as a keyboard 109, a mouse 110, etc., to a system 100. The user can input commands etc. for processing and displaying the images, through the keyboard 109 and the mouse 110.

A network interface 105 can connect the system 100 to local networks, such as LAN (Local Area Network), and a wide area network, such as the Internet, according to predetermined communication protocols, such as Ethernet.

On a network, a plurality of host terminals and servers (not shown) are connected in a transparent status, and a distributed computing environment is built On the network, services for distributing a software program, data contents, etc. can be provided. For example, an image data is downloadable to the HDD (111) via the network from other servers in which the images captured by others are saved.

An external device interface 106 is a device for connecting an external device, such as a digital camera, the hard disk drive (HDD) 111, and the media drive 112, to the system 100.

The HDD 111 is an external storage apparatus which fixedly carries a magnetic disk as a storage media, is superior to other external storage apparatuses in terms of a storage capacity, a data transfer speed, etc., and also provides random access. To place a software program to be executed on the HDD 111 is referred to as "to install" the program in the system. Usually, a program code of the operating system, an application program, a device driver, etc. which are to be executed by the CPU 101 are stored in the HDD 111 in a non-volatile manner. For example, an image compensation program, as described later, can be installed on the HDD 111.

A media drive 112 is a device having mounted thereon a portable medium 160, such as a CD (Compact Disc), and an MO (Magneto-Optical disc), a DVD (Digital Versatile Disc), for accessing their data recording sides.

The portable medium 160 is used for mainly backing up a software program, a data file, etc. as computer readable data, and for moving them between systems (that is, sale, circulation, and distribution are included). An application program for performing an imaging process can be physically circulated and distributed among a plurality of devices, by using these portable media.

In addition, an example of the image processing apparatus 100 as shown in FIG. 3 is realizable as a compatible machine or a succeeding machine of a personal computer "PC/AT (Personal Computer/Advanced Technology)" from U.S. IBM Corporation. Of course, it is also possible to use a computer equipped with another architecture as the image processing apparatus 100 with respect to this preferred embodiment Furthermore, it is also realizable as a structure to perform a process within the digital camera by incorporating it into the digital camera.

Hereinafter, a particular example of image processing in the image processing apparatus of the present invention will be described. As shown in FIG. 4, an imager images a person A, 250 as an imaging subject, with a camera (digital camera) 210 as the imaging means. The person A, 250 is in a dark room 200, the imager carries the camera (digital camera) 210 with a stroboscope 211, and the camera 210 are in a position dose to the person A, 250.

The camera 210 detects an intensity of ambient light and automatically images in "strobe serial imaging" mode. Alternatively, an imager operates a button which is intentionally attached to the digital camera so that the imaging is carried out as the "strobe serial imaging" mode. In addition, the "strobe serial imaging" mode is a mode in which a plurality of images applied to the processing in the image processing apparatus of the present invention are continuously captured, and this is not a general term.

In the "strobe serial imaging" mode, when the imager pushes a release button, the serial imaging for a plurality of images (for example, three images) is automatically carried out In the "strobe serial imaging" mode, when the release button is pushed, firstly the imaging is performed while causing a stroboscope to emit light in a conventional manner. The captured image is immediately captured into a memory (frame memory) in the digital camera as a first image.

After the first image is captured into the memory, the imaging is performed again while causing the stroboscope to emit a weaker light than that at the time of imaging the first image. Then, it is captured into the memory in the camera as a second image. Furthermore, after it is taken in, the imaging is performed again without causing the stroboscope to emit light Then, it is captured into the memory in the digital camera as a third image.

In addition, there is no rule of order for taking these images. Alternatively, by using a plurality of the imaging apparatuses, the imaging may be carried out at substantially the same time. Moreover, by pushing the release button three times, while intentionally controlling the intensity of light of the stroboscope, the above-mentioned first image, the second image, and the third image may be captured by an imager.

Figure 5A:
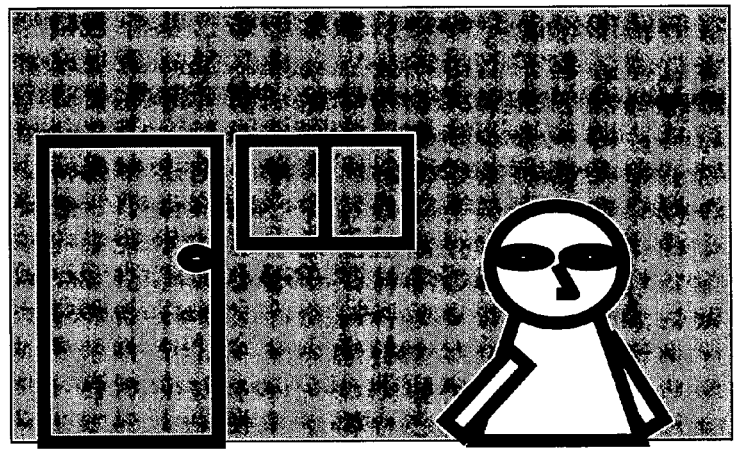
FIGS. 5 are views for explaining an example of a plurality of captured images in the image processing apparatus of the present invention.
Figure 5B:
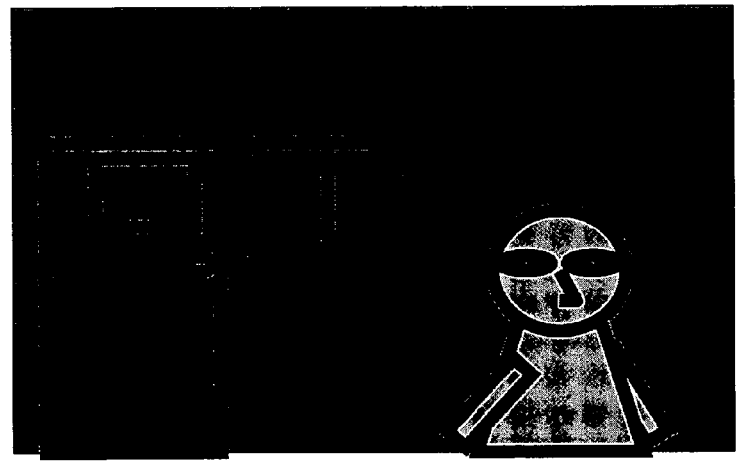
Figure 5C:

The images as shown for example, in FIG. 5 are obtained according to the imaging. FIG. 5($a$) is the first image captured with usual light irradiation, FIG. 5($b$) is the second image captured with low intensity light irradiation, and FIG. 5($c$) is the third image captured with the lowest intensity light irradiation.

Figure 6:
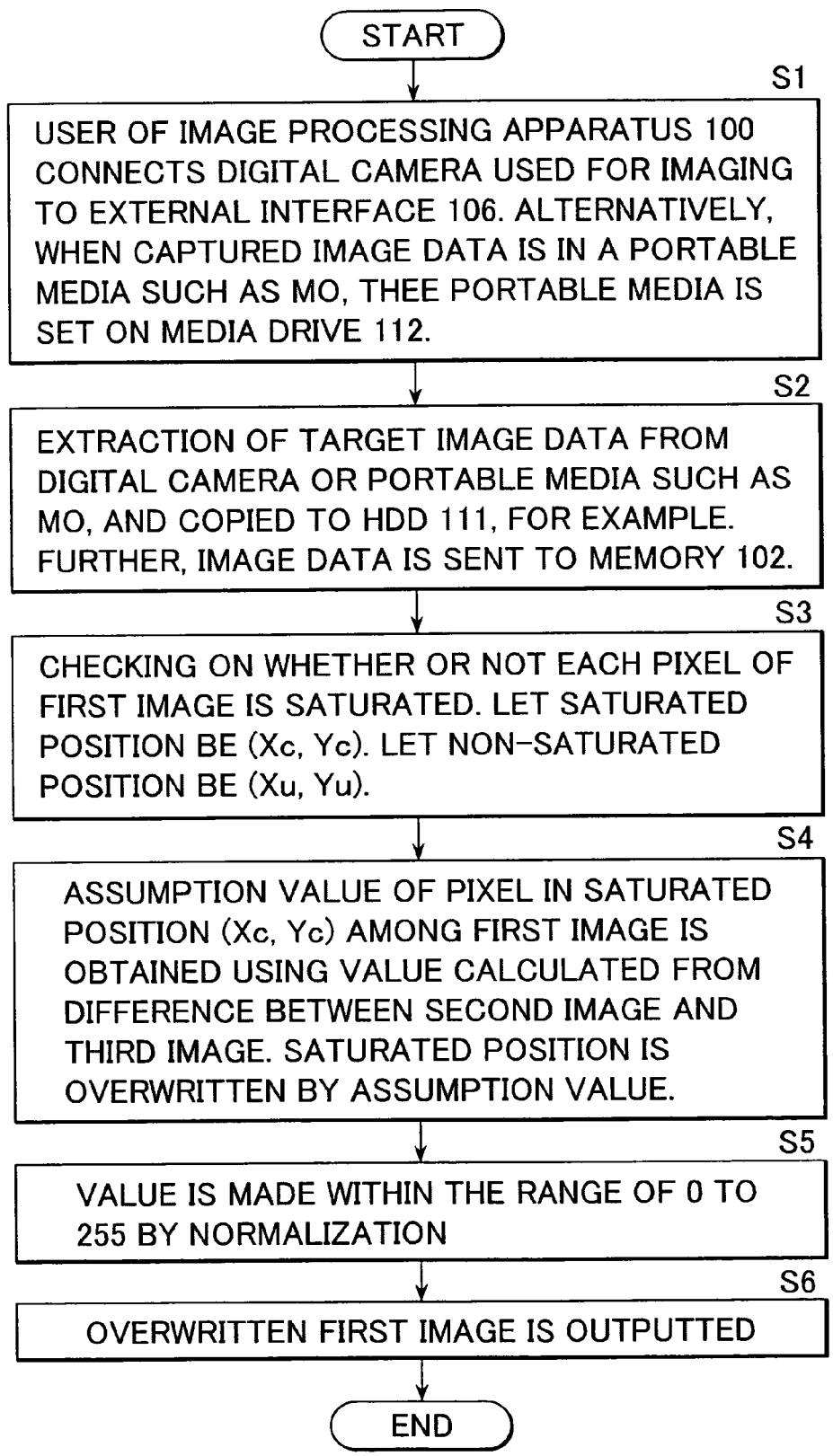
FIG. 6 is a flow chart for explaining a pixel value compensation process in the image processing apparatus of the present invention.

FIG. 6 shows, in the form of a flow chart, a procedure performed on the image processing apparatus 100 of the present invention. By using FIG. 6, the procedure in the image processing apparatus of the present invention will be described in detail with reference to the image processing apparatus of FIG. 3.

Firstly, in step 1 of FIG. 6, the user of the image processing apparatus 100 connects the digital camera used for the imaging to the external interface 106. Alternatively, when the captured data are in the portable media, such as an MO, the portable media are mounted in the media drive 112.

In step 2, the image data to be processed is taken out of the portable media, such as the digital camera or the MO, and copied into the HDD 111, for example. Here, the captured image data are a plurality of images captured in the above-mentioned "strobe serial imaging" mode, i.e., a plurality of image data under the different exposure conditions. For example, they are three image data as shown in FIG. 5. In step 2S, the image data are further transmitted to the memory 102 Of course, though it is not necessary to copy it into the HDD 111 once, it is, however, preferable to copy it into the HDD 111 so as to watch it again without connecting to the portable media, such as a digital camera and MO. Then, the process moves to step 3.

In step 3, the CPU 101 analyzes the first image data, for example, the first image data captured by the usual light irradiation as shown in FIG. 5($a$), and extracts a saturated image data area, which is determined for each pixel in the image data by the CPU 101 as to whether or not there are one or more elements having 255 among three elements R, G, and B.

In other words, a pixel having a value, either a pixel value R=255, a pixel value G=255, or a pixel value B=255, is extracted as the saturation pixel. A saturated pixel position is set to (Xc, Yc). A pixel position which is not saturated is set to (Xu, Yu). Then, the process moves to step 4.

In step 4, a compensation pixel data of the saturated pixel position (Xc, Yc) in the first image obtained in step 3 i.e., the compensation pixel image is calculated based on the second image and third image. A particular process of step 4 will be described with reference to FIG. 7 and FIG. 8. In addition, in FIG. 7 and FIG. 8, steps 41-45 show detailed processes of step 4 in FIG. 6, and steps 51-52 show detailed processes (normalization processing) of step 5 in FIG. 6. These processes are carried out by performing a process, as described below, by means of the CPU 101.

Firstly, in step 41, the position (Xc, Yc) of the saturated pixel (saturation pixel) in the first image and the position (Xu, Yu) of the pixel (non-saturated pixel) which has not been saturated in the first image are determined, so that pixel position information is acquired. The saturated pixel (saturation pixel) is a pixel in which any one of R, G, and B is set as the maximum value (for example, 255). The non-saturated pixel is the other pixel, i.e., a pixel in which any one of R, G, and B is not set as the maximum value (for example, 255).

Next, in step 42, the pixels in the same position as the position (Xc, Yc) of the saturated pixel (saturation pixel) in the first image are taken out of the second image and the third image. R, G, and B of the first saturated pixel are represented by Rc1, Gc1, and Bc1, respectively. R, G, and B of the pixel in the same position taken out of the second image are represented by Rc, Gc2, and Bc2 respectively. Moreover, R, G, and B of the pixel in the same position taken out of the third image are represented by Rc3, Gc3, and Bc3 respectively.

Further, the pixels in the same position as the position (Xu, Yu) of the pixel (non-saturated pixel) which has not been saturated in the first image are taken out of the second image and third image. R, G, and B of the first non-saturated pixel are represented by Ru1, Gu1, and Bu1 respectively. R, G, and B of the pixel in the same position taken out of the second image are represented by Ru2, Gu2, and Bu2 respectively. Further, R, G, and B of the pixel in the same position taken out of the third image are represented by Ru3, Gu3, and Bu3 respectively.

Next, in step 42, with respect to each position (Xu, Yu) of the pixel (saturation pixel) which is not saturated in the first image, P (Xu, Yu) is calculated by (equation 1) as shown below.

$$P(Xu, Yu) = \sqrt{\left(\frac{(Ru1 - Ru3)}{(Ru2 - Ru3)}\right)^2 + \left(\frac{(Gu1 - Gu3)}{(Gu2 - Gu3)}\right)^2 + \left(\frac{(Bu1 - Bu3)}{(Bu2 - Bu3)}\right)^2} \quad \text{(equation 1)}$$

With respect to every position (Xu, Yu) of the pixel which is not saturated in the first image, P (Xu, Yu) is calculated by (equation 1). Further, in step 44, an average :S of P (Xu, Yu) of all pixel positions is calculated. The average S is calculated by the following (equations 2):

$$S = \frac{\sum P(Xu, Yu)}{n} \qquad \text{(equation 2)}$$

In the above (equation 1) and (equation 2), (Xu, Yu) is a position of the pixel which is not saturated in the first image. n is a total number of the pixels which are not saturated in the first image.

:S calculated by the above-mentioned (equation 1) and (equation 2) indicates a ratio of "intensity of emitted strobe light when imaging first image=[high intensity strobe light]" to "intensity of emitted strobe light when imaging second image=[low intensity strobe light]." That is, it can be that S indicates the ratio of the intensity of irradiation light as an exposure condition difference data of each image data.

In other words, (Ru1−Ru3, Gu1−Gu3, Bu1−Bu3) are differences derived by subtracting, from the pixel values (Ru1, Gu1, Bu1) of the first image with respect to the pixel (non-saturated pixel) which is not saturated in the first image, the pixel values (Ru3, Gu3, Bu3) in the corresponding position of the third image. The differences indicate pixel values in a projection image purely irradiated with the [high intensity strobe light] by removing ambient light components. The [high intensity strobe light] as mentioned here means the strobe light emitted when taking the first image.

Similarly, (Ru2−Ru3, Gu2−Gu3, Bu2−Bu3) are difference values derived by subtracting, from the pixel values (Ru2, Gu2, Bu2) of the second image in the position corresponding to the pixel (non-saturated pixel) which has not been saturated in the first image, the pixel values (Ru3, Gu3, Bu3) in the corresponding position of the third image. The difference values constitute a projection image purely irradiated with the [low intensity strobe light] by removing ambient light components. The [low intensity strobe light] as mentioned here means a strobe light emitted when taking the second image.

Therefore, the exposure condition difference data :S calculated by way of the above-mentioned (equation 2) indicates a ratio of "intensity of strobe light emitted when imaging first image=[high intensity strobe light]" to "intensity of strobe light emitted when imaging second image=[low intensity strobe light]."

Thus, by way of an image-analysis process based on the three images captured under different light conditions, the ratio :S of "intensity of strobe light emitted when imaging first image=[high intensity strobe light]" to "intensity of strobe light emitted when imaging second image=[low intensity strobe light]" is calculated.

In addition, on the imaging apparatus (camera) side or the control unit connected to the camera, if it is possible to correctly control the intensity of the strobe emission to acquire the data which indicates the ratio of "intensity of strobe light emitted when imaging first image=[high intensity strobe light]" to "intensity of strobe light emitted when imaging second image=[low intensity strobe light]", then the acquired data may be regarded as S.

Next, in step 45 (FIG. 8), the position (Xc, Yc) of the pixel (saturation pixel) which is saturated in the first image is captured, and temporary compensation pixel values (Rcq, Gcq, Bcq) in each position (Xc, Yc) is calculated according to the following (equations 3) by using the exposure condition difference data :S.

$$Rcq = (Rc2 - Rc3) \times S + Rc3$$

$$Gcq = (Gc2 - Gc3) \times S + Gc3$$

$$Bcq = (Bc2 - Bc3) \times S + Bc3 \qquad \text{(equation 3)}$$

Then, the temporary compensation pixel values (Rcq, Gcq, Bcq) expressed by (equation 3) are set up as the temporary compensation pixel values with respect to the saturation pixel position (Xc, Yc) in the first image, respectively.

where, (Xc, Yc) is the position of the saturated pixel (saturation pixel) in the first image. The values (Rcq, Gcq, Bcq) calculated by the above-mentioned (equation 3) are values of the pixel, assuming that the intensity of light of S times "intensity of strobe light emitted when imaging second image=[low intensity strobe light]" is emitted. In other words, they are the values of the pixel, assuming that they are not saturated when irradiated with "intensity of strobe light emitted when taking first image=[high intensity strobe light]".

Therefore, the pixel values calculated by the above-mentioned (equation 3) can be the values exceeding the maximum value (for example, 255) of the pixel value of an actual image.

Thus, in step 4 (steps 41-45 of FIGS. 7 and 8) in the processing flow of FIG. 6, a process is carried out for replacing the saturation pixel in the first image by an assumed pixel value when assuming that it is not saturated, i.e., by an assumed temporary compensation pixel values (Rcq, Gcq, Bcq).

Next, in step 5, the normalization process is performed for the temporary compensation pixel values (Rcq, Gcq, Bcq) calculated in step 4 corresponding to the pixel (Rc, Gc, Bc) in the saturation pixel position (Xc, Yc) and a constituent pixel value of the first image constituted by the pixel (Ru, Gu, Bu) in the non-saturated pixel position (Xu, Yu).

For the temporary compensation pixel values (Rcq, Gcq, Bcq) calculated in the replacement process for the pixel data in step 4, all values of Rcq, Bcq or Gcq are not always set up within a range of 0-255 as described above, and any of the values may exceed 255. An image cannot be outputted in this situation. Then, the normalizing process is performed so that the values of R, G, and B of all pixels may be limited to an allowed output value, for example, in a range of 0-255, so as to calculate right compensation pixel values (Rcf, Gcf, Bcf).

Figure 8:
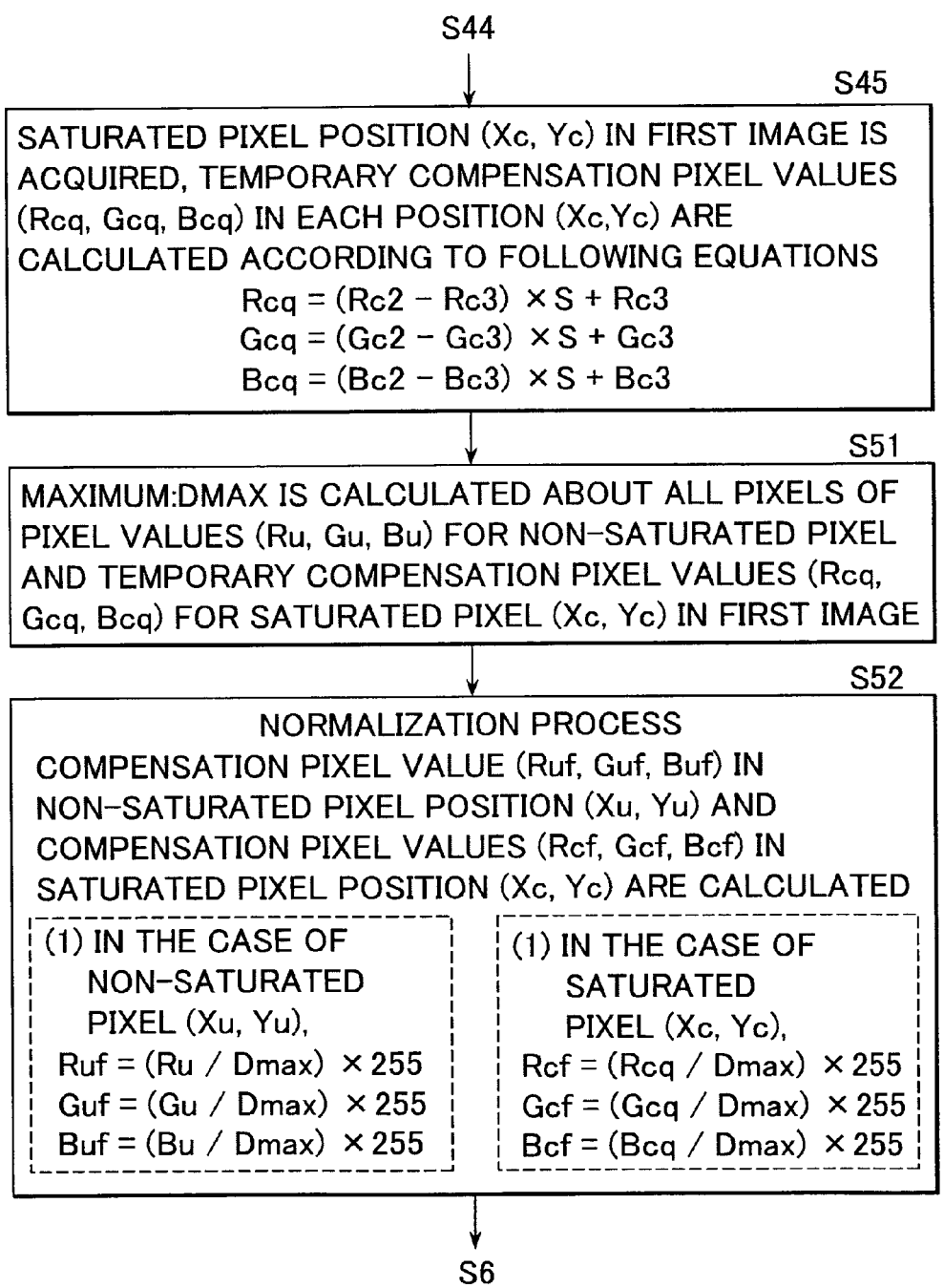
FIG. 8 is a flow chart for explaining the pixel value compensation process in the image processing apparatus of the present invention.

A particular normalizing process will be described with reference to steps 51 and 52 of FIG. 8. Firstly, in step 51, a maximum pixel value Dmax of the first image is calculated.

In other words, the pixel values: (Ru, Gu, Bu) of the non-saturated pixel (Xu, Yu) of the first image, and pixel values for all the pixels of the first image constituted by the temporary compensation pixel values (Rcq, Gcq, Bcq) calculated in step 4 (=steps 41-45) according to the saturation pixel (Xc, Yc) are obtained respectively, and the maximum value of all: Dmax is calculated.

Next, in step 52, each pixel value of the constituent pixels of the first image is divided by the maximum pixel value Rmax, Gmax, or Bmax calculated in step 51, and the compensation pixel values Ruf, Guf, Buf) in the non-saturated pixel position (Xu, Yu) and the compensation pixel values (Rcf, Gcf, Bcf) in the saturation pixel position (Xc, Yc) are respectively calculated by the following (equations 4).

(1) In the case of the non-saturated pixel (Xu, Yu), $$Ruf = (Ru/D\max) \times 255$$

$$Guf = (Gu/D\max) \times 255$$

$$Buf = (Bu/D\max) \times 255$$

In the case of the saturation pixel (Xc, Yc), $$Rcf = (Rcq/D\max) \times 255$$

$$Gcf = (Gcq/D\max) \times 255$$

$$Bcf = (Bcq/D\max) \times 255 \qquad \text{(equations 4)}$$

The pixel values calculated by the above-mentioned equations 4, i.e., the compensation pixel values (Ruf, Guf, Buf) in the non-saturated pixel position (Xu, Yu), and the compensation pixel values (Rcf, Gcf, Bcf) in the saturation pixel position (Xc, Yc) can be held in a value between 0 and 255. These compensation pixel values are used as output pixel values.

The normalizing process is not limited to the above-mentioned processing Another normalization process may be used, such as a process described in Japanese Patent Application No.2002-25464, which is a patent application by the same applicant as the present applicant This is a processing method for converting an image having a wide dynamic range (that is, an image having a value exceeding 255) into an image having a narrow dynamic range (that is, an image whose pixel values R, G, and B are all within the range of between 0 and 255), without giving sense of incongruity to a human's vision. By using the processing method, the compensation pixel values (Ruf, Guf, Buf) in the non-saturated pixel position (Xu, Yu) which constitute the first image, and the compensation pixel values (Rcf, Gcf, Bcf) in the saturation pixel position (Xc, Yc) are calculated, to thereby hold the values of R, G, and B of all pixels in the range of 0 to 255.

After the normalization processing in step 5 (steps 51 and 52 of FIG. 8) in FIG. 6, the process moves to step 6. In step 6, the first image rewritten in step 5 is outputted and the process is ended. This image is an image constituted by the compensation pixel values (Ruf, Guf, Buf) in the non-saturated pixel position (Xu, Yu), and the compensation pixel values (Rcf, Gcf, Bcf) in the saturation pixel position (Xc, Yc).

The thus obtained image is an image in which the pixel saturated in the first original image is replaced with the pixel assumed to have not been saturated, which removes the conventional disadvantages. In other words, the saturated values of (R, G, B) and the brightest white which are caused by strobe imaging when a subject is in the vicinity, can be avoided.

Figure 7:
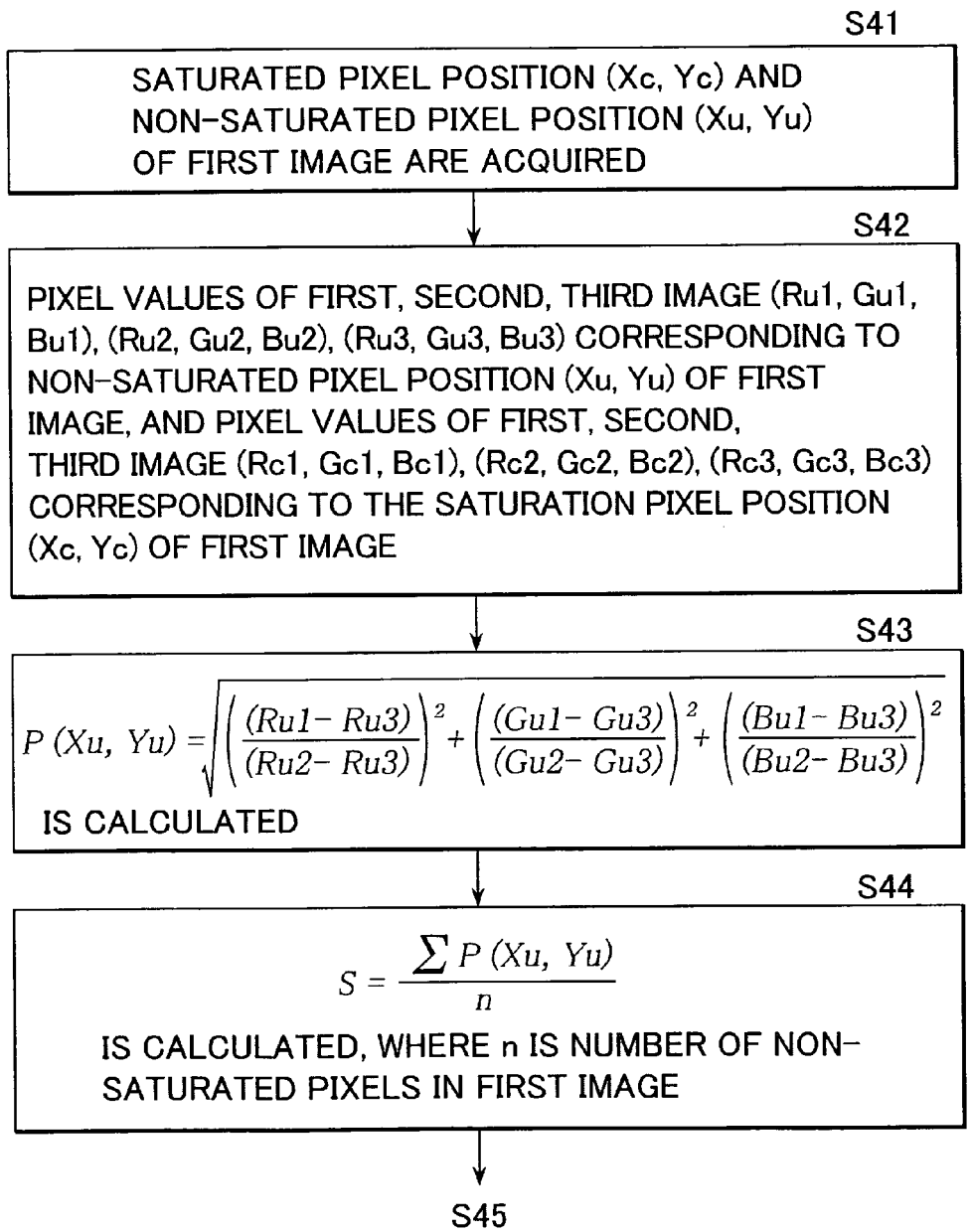
FIG. 7 is a flow chart for explaining the pixel value compensation process in the image processing apparatus of the present invention.
Figure 9:
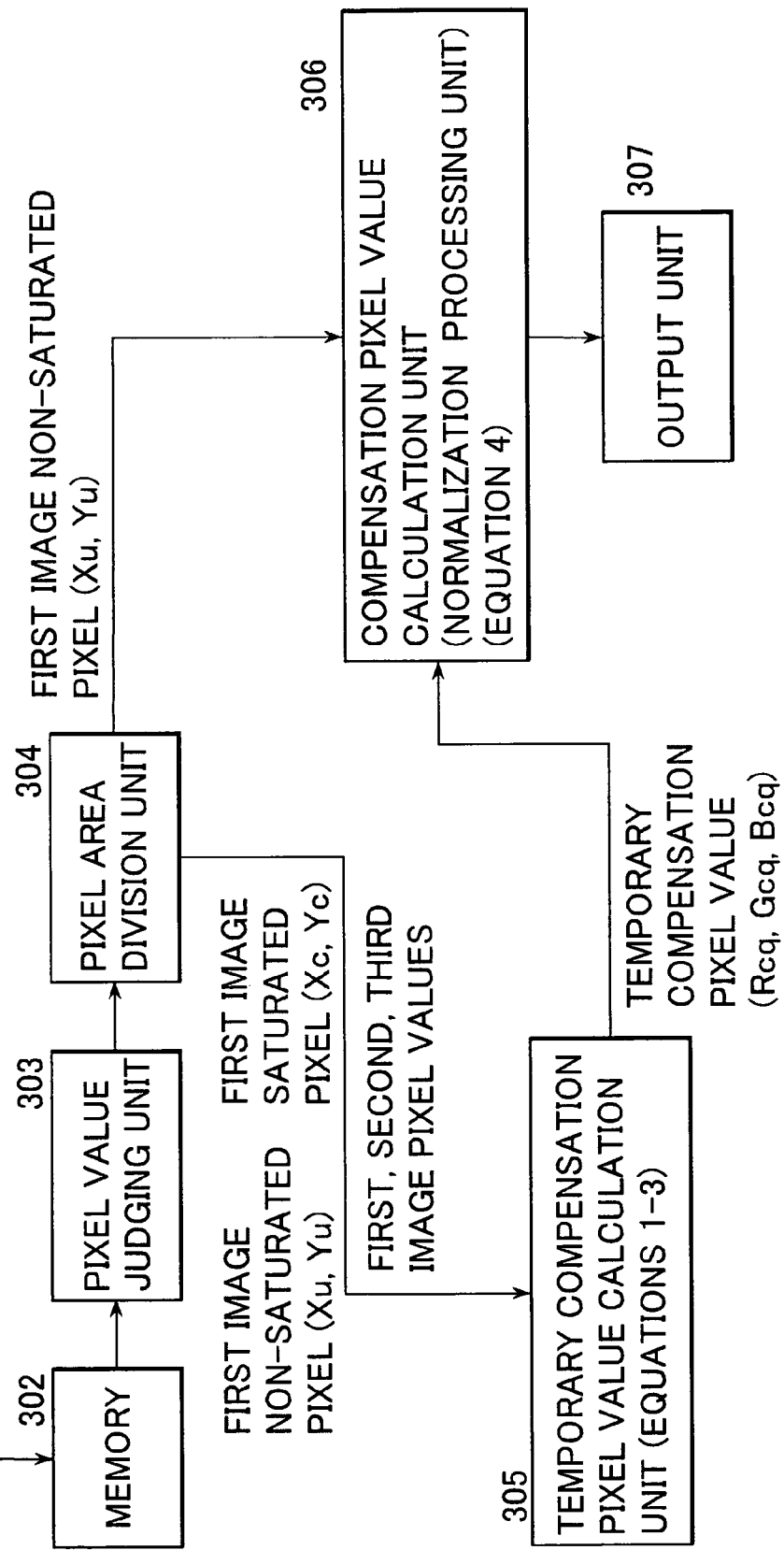
FIG. 9 is a functional block diagram showing a process for performing pixel value compensation in the image processing apparatus of the present invention for each function.

FIG. 9 is a functional block diagram for explaining processing in the image processing apparatus of the present invention. The image processing apparatus can be realized in, for example, a PC etc. having a CPU as described before by using FIG. 3. The program in which the processing procedure is recorded as described with reference to FIGS. 6-8 is executed in the CPU, so that the calculation of the compensation pixel value is attained. FIG. 9 is the functional block diagram showing the processing function which is mainly performed in the CPU and individually blocked.

In an imaging unit 301, the plurality of images (see FIG. 2 and FIG. 5) in which the above-mentioned exposure conditions are changed are captured, and the plurality of images is stored in a memory 302 In the pixel value judging unit 303, a pixel value judging process is performed with respect to the plurality of images stored in the memory 302, and an acquisition process for the pixel values of the plurality of images is carried out.

In a pixel area division unit 304, the pixel values in the first image obtained in the pixel value judging unit 303 are divided into a saturated pixel area and a non-saturated pixel. The saturated pixel is a pixel in which there are one or more elements, out of three elements R, G, B, having the maximum value (for example, 255). The other pixels are non-saturated pixels.

All pixel value data of the first through third images are taken into the temporary compensation pixel value calculation unit 305. By using the above-mentioned equations 1-3, the temporary compensation pixel values (Rcq, Gcq, Bcq) in the saturation pixel position (Xc, Yc) in the first image are calculated.

In the compensation pixel value calculation unit (normalization processing unit) 306, the pixel values (Ru, Gu, Bu) of the non-saturated pixel (Xu, Yu) of the first image are inputted from the pixel area division unit 304. Furthermore, the temporary compensation pixel values (Rcq, Gcq, Bcq) of the saturation pixel (Xc, Yc) of the first image are inputted from the temporary compensation pixel value calculation unit 305. According to the above-mentioned (equations 4), the compensation pixel values (Ruf, Guf, Buf) in the non-saturated pixel position (Xu, Yu) and the compensation pixel values (Rcf, Gcf, Bcf) in the saturation pixel position (Xc, Yc) are calculated, respectively.

In the output unit 307, the image data according to the compensation pixel value calculated in the compensation pixel value calculation unit (normalization processing unit) 306 is outputted.

In addition, the structure shown in FIG. 9 may also be arranged as the imaging apparatus (camera). If it is the case, the image processing apparatus structure as described above with reference to FIG. 3 may be incorporated into the imaging apparatus (camera), so as to store the compensation image data in a memory unit constituted by a DVD, a CD, the flash memory, etc., for example. The imaging unit performs a process of setting up different exposure conditions continuously according to the above description, taking a plurality of images (see FIG. 2 and FIG. 5), and causing the image processing unit (see FIG. 3) containing the CPU provided in the imaging apparatus to perform the above-mentioned process, so as to calculate the compensation pixel value and store the image data based on the compensation pixel value in the memory unit.

In the imaging apparatus according to the present structure, the image data compensated based on the plurality of images are stored in the memory unit, so that a clear image data in which the saturation pixel value is compensated can be saved as record data.

Thus, according to the image processing apparatus or the imaging apparatus of the present invention, as for the image data having the pixel area in which the excessive irradiation light occurs due to the usual irradiation light so that the pixel value is the maximum and in the saturation statue, the optimum pixel value is calculated by compensating the pixel value, to thereby output or record the dear image data.

In addition, in the above-mentioned example, although the example of structure is described which performs pixel value compensation based on three types of images, imaging by a normal strobe light imaging by a low intensity strobe light, and imaging by the minimum intensity strobe light, it may also be arranged to perform the compensation process by using four or more images captured under different exposure conditions. In this case, a plurality of ratios of the strobe lights each having the intensity obtained in the above-mentioned (equation 2) are calculated. By applying (the equation 3) to each of them, the temporary compensation pixel values are calculated. After setting an average value of the temporary compensation pixel value as a final temporary compensation pixel value, the normalization process can be carried out by way of (equation 4).

Further, in the above-mentioned preferred embodiment, although the process using the plurality of images captured by changing the intensity of the strobe light is described, a similar compensation process can be performed with respect to a plurality of images captured by changing the exposure time. In other words, it is possible that the ratio:S of the amounts of irradiation light based on the difference in exposure time for each image data is calculated by way of the above mentioned (equation 2), a similar compensation pixel value calculation process is performed, and so on.

Figure 10:
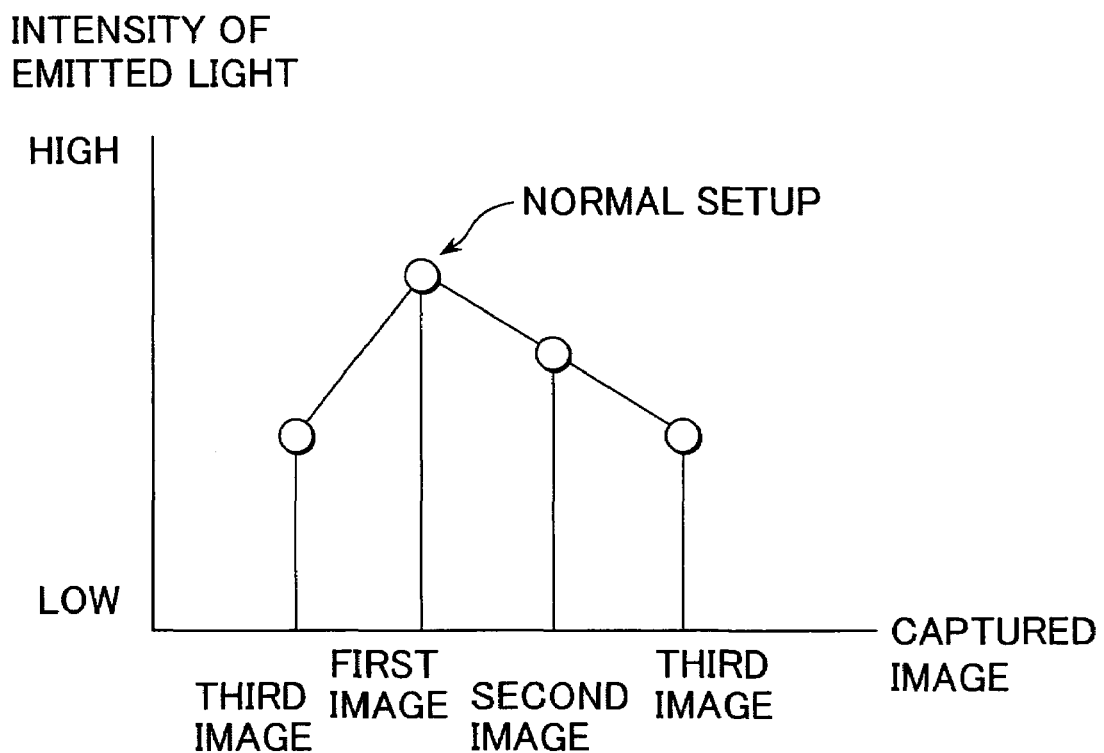
FIG. 10 is a graph for explaining the exposure conditions of a plurality of images captured in the image processing apparatus of the present invention.

Further, as shown in FIG. 10, a third' image may be captured without emitting the strobe light, before taking the first image, (1) The third' image (without strobe light),
(2) The first image (normal strobe light),
(3) The second image (low intensity strobe light), and
(4) The third image (without strobe light)

are captured, "an average value of the third image and the third' image" is calculated, and the calculated image may be used as the third image in the above-mentioned description. Thus, by performing the average processing, it is possible to compensate "shift between images" caused by the person A's movement during the serial imaging, and also to reduce noises.

Further, in the above-mentioned preferred embodiment, the pixel value is shown as an example of compensation with respect to the image data which is constituted by three primary colors of (R, G, B). Luminance compensation can be carried out by way of a similar process, also with respect to an image data which is not a color image but black and white, i.e., only a luminance data. Further, also with respect to an image data expressed by colors other than RGB, a saturated data can be compensated by compensating each data value.

[2 Optimum White Balance Adjustment Process for Imaging Under Environment where Ambient Light and Flash Light are Mixed]

Next, the optimum white balance adjustment processing arrangement for imaging under an environment where ambient light and the flash light are mixed will be described.

Figure 11:
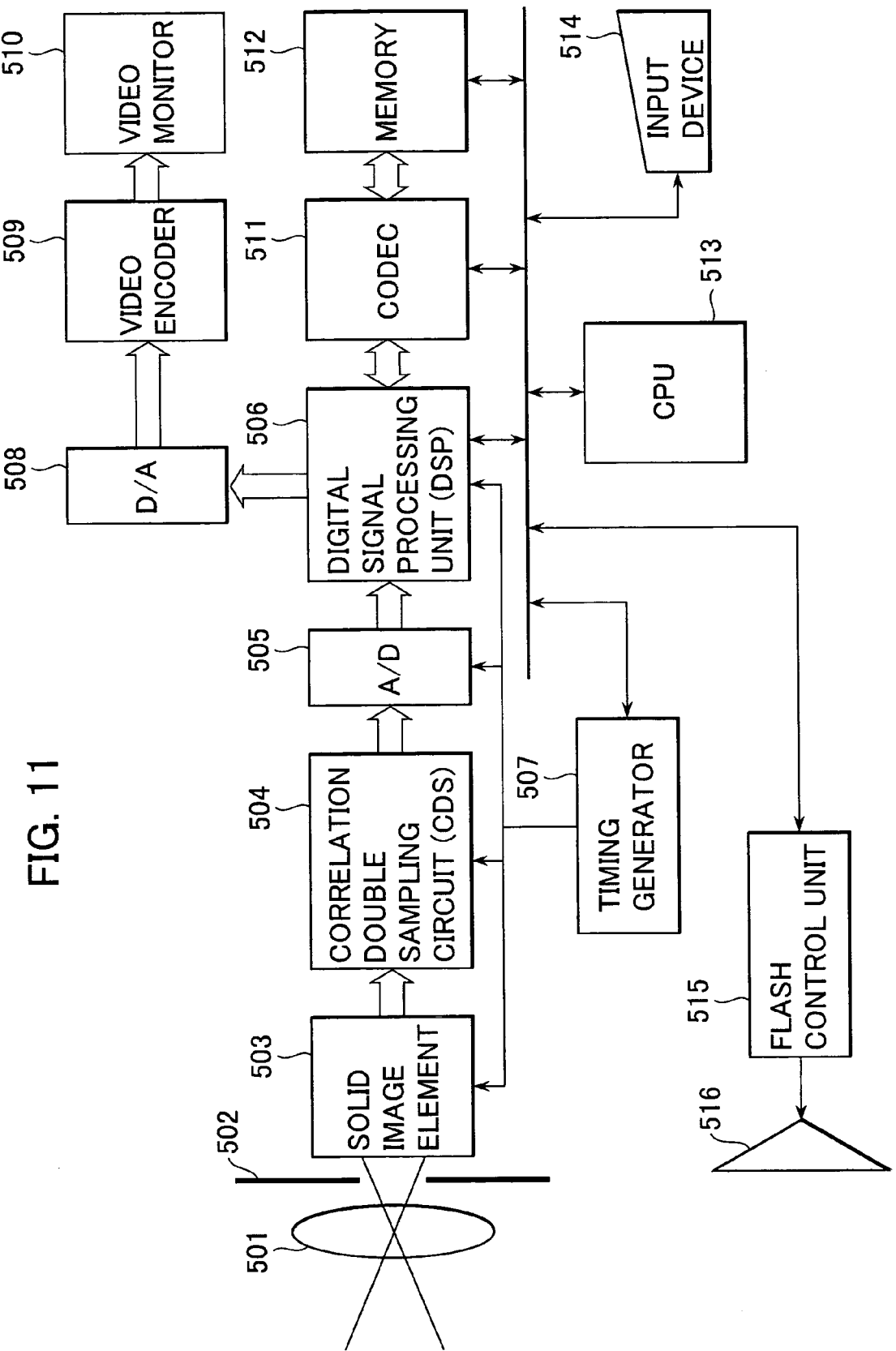
FIG. 11 is a diagram showing a structure of the image data processing apparatus of the present invention.

FIG. 11 is a diagram showing a structure of the imaging apparatus in accordance with the present example of embodiment As shown in FIG. 11, the imaging apparatus in accordance with the preferred embodiment is provided with a lens 501, an iris diaphragm 502, a solid-state image element 503, a correlation double sampling circuit 504, an A/D converter 505, a DSP block 506, a timing generator 507, a D/A converter 508, a video encoder 509, a video monitor 510, a codec (CODEs) 511, a memory 512 a CPU 513, an input device 514, a flash control unit 515, and a flash emission apparatus 516.

Here, the input device 514 includes manual operation buttons, such as a recording button in a camera body. Further, the DSP block 506 is a block having a processor for signal processing and a RAM for an image, so that the processor for signal processing can perform an image process which is programmed beforehand, with respect to the image data stored in the RAM for the image. The DSP block is simply referred to as the DSP below.

A general operation of this example of preferred embodiment will be described below.

An incident light passed an optical system and reached the solid-state image element 503 firstly reaches each photo receptor on an imaging surface, and is converted into an electric signal by way of photoelectric conversion at the photo receptor, subjected to noise removal by means of the correlation double sampling circuit 504, converted into a digital signal by the A/D converter 505, then stored in an image memory in the digital signal processing unit (DSP) 506 temporarily. In addition, if necessary, the flash emission apparatus 516 can be caused to emit light through the flash control unit 515 in the case of imaging.

During the imaging, the timing generator 507 controls a signal processing system so as to maintain image capturing at a fixed frame rate. After the stream of a pixel is sent also to the digital signal processing unit (DSP) 506 at a fixed rate where suitable image processing is performed, an image data is sent to the D/A converter 508 and/or the codec (CODEC) 511. The D/A converter 508 converts the image data sent from the digital signal processing unit (DSP) 506 into an analog signal, which is converted by the video encoder 509 into a video signal, so as to monitor the video signal by means of the video monitor 510. The video monitor 510 plays the role of a finder of the camera in the present example of embodiment Further, the codec (CODEC) 511 encodes the image data received from the digital signal processing unit (DSP) 506, and the encoded image data is recorded in the memory 512. Here, the memory 512 may be a recording device using a semiconductor, a magnetic recording medium, a magneto optical recording medium, an optical recording medium, etc.

Although the whole system of a digital camcorder of the present example of embodiment is described above, in the present example of embodiment the present invention is implemented in image processing in the digital signal processing unit (DSP) 506. Part of the image processing will be described in detail below.

As described above, the image processing unit of the present example of embodiment is actually provided in the digital signal processing unit (DSP) 506. Therefore, in the structure of the present example of embodiment, an operation of the image processing unit is realized such that, with respect to the stream of the inputted image signal, an operation unit sequentially carries out operations described in a predetermined program code in digital signal processing unit (DSP) 506. In the following description, a procedure that performs each process in the program will be described by way of a flow chart. However, other than the example of preferred embodiment of the program which is described in the present example of embodiment, the present invention may be configured to mount a hardware circuit which realizes a process equivalent to function as will be described henceforth.

Figure 12:
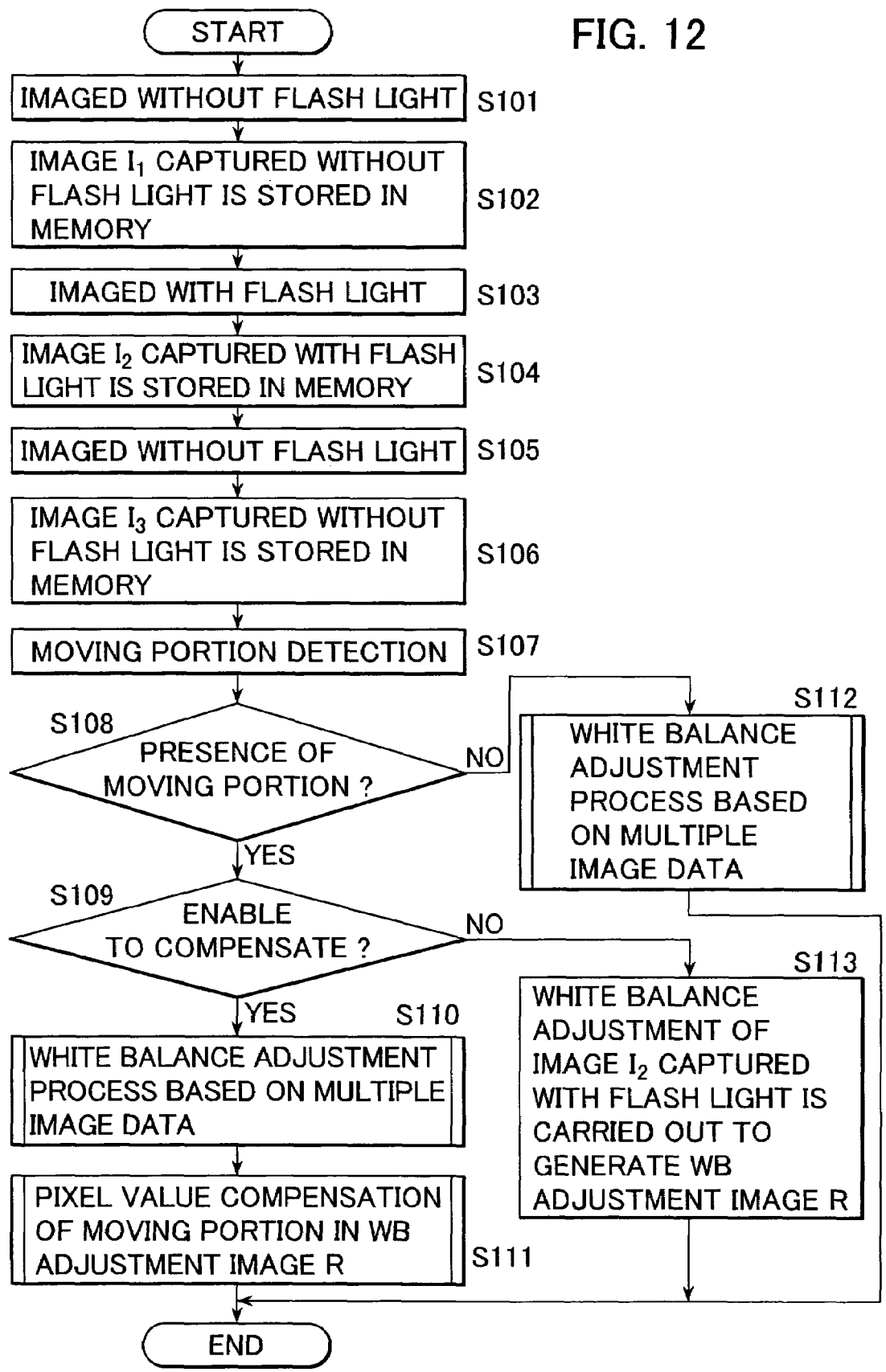
FIG. 12 is a flow chart for explaining a procedure of an image data processing method of the present invention.

FIG. 12 is a flow chart for explaining a procedure of the white balance (WB) adjustment process performed with respect to the stream of the inputted image signal within the digital signal processing unit (DSP) 506.

In step 101, using the iris diaphragm and shutter speed set up in advance, the imaging is carried out without flash light and the image captured without flash light is stored in a memory as an image data $I_1$ in step 102.

In step 103, similar to step 101, using the iris diaphragm and shutter speed set up in advance, the imaging is carried out by way of flash light In step 104 this image captured with flash light is stored in the memory as an image data $I_2$.

Next in step 105, similar to step 101, using the iris diaphragm and the shutter speed set up in advance, the imaging is carried out again without flash light. In step 106 the image captured without flash light is stored in the memory as an image data $I_3$.

In addition, the imaging in steps 101, 103, 105 are performed as continuous imaging, for example, sequential imaging at about 1/100 second intervals. Using a plurality of images obtained from respective imaging steps, the white balance (WB) adjustment process is performed and an image data whose white balance (WB) is adjusted is generated.

Further, the image data $I_1$, $I_2$, and $I_3$ stored in the memory in steps 102, 104, and 106 are considered as images adjusted in blurring compensation. In other words, when a blur takes place at the time of taking three images $I_1$, $I_2$, and $I_3$, the blur is compensated beforehand, then stored in the memory.

In other words, when the captured image is a blurred image, the blur is compensated between steps 101 and 102, between steps 103 and 104, and between steps 105 and 106, and the compensated image is stored in the memory. Therefore, the image data $I_1$, $I_2$, and $I_3$ stored in the memory appear as if they are sequentially captured in a situation where a camera is mounted on a tripod.

In addition, a blurring compensation process can use a conventionally known process. For example, a method of detecting a shift by using an acceleration sensor so as to shift a lens, a method of reading a suitable portion such that an image of higher resolution than a target resolution may be captured using an image element so as not to cause a shift, or a method of correcting blurring only by way of image processing without using a sensor further, are conventionally and widely used.

Next in step 107, it is detected whether there is an image blur originating from a motion of the imaging subject itself during the imaging of three images in steps 101, 103, and 105. The detection process of whether there is any image blur resulting from the motion of the imaging subject itself is carried out by comparing two images out of three images. For example, a moving portion can be detected by using the image $I_1$ and the image $I_3$. As an example, a difference is taken for each pixel of the image $I_1$, and the image $I_3$. When the difference is larger than a certain threshold value, the corresponding pixel may be registered as a moving portion. When it is determined that there is not an image blur resulting from a motion of the imaging subject itself (step 108: No), the process moves to step 112 When a motion is detected (step 108: Yes), the process goes to step 109.

In step 109, it is determined whether or not a compensation process is applicable which performs suitable white balance (WB) adjustment with respect to the moving portion detected in step 107. This determination process uses, for example, a process carried out based on the ratio of a number of pixels registered as the moving portion in step 107, to a number of pixels of the whole image. For example, when the ratio [ratio A] of the number of pixels registered as the moving portion to the number of pixels of the whole image is larger than a certain predetermined fixed threshold value [Threshold], it is determined to be impossible to compensate the pixel. When the ratio is less than the threshold value, it is determined to be possible to compensate it.

When it is determined to be impossible to compensate it in step 109, the process moves to step 113. When it is determined to be possible to compensate it, the process goes to step 110.

In step 113, the white balance (WB) adjustment is performed with respect to the image data $I_2$ captured with flash light, an output image R is generated, and the process is ended. A parameter value used for the white balance adjustment is either a parameter set up in accordance with ambient light component, a parameter set up in accordance with a flash light component, or a parameter set up based on the middle component of the ambient light and the flash light Having set up these parameters, the white balance (WB) adjustment is carried out In addition, this white balance adjusting method is a conventionally performed method, so that its description in detail is omitted. In addition, the parameter to be used is a parameter shown by a 3×3 matrix, and is a matrix applied to conversion of color components which constitute a color of each pixel. As for the 3×3 matrix, a matrix set as 0 with exception to diagonal components is used.

Next, the white balance (WB) adjustment process based on a plurality of image data in step 110 and step S112 will be described. The processes in step 110 and step S112 are the same processes. The process will be described in detail with reference to FIG. 13.

In step 201, a difference is taken between a component of the image data $I_2$ captured with flash light and a component of each color of the pixel of the image $I_1$ captured without flash light, so that a difference image $F=I_2-I_1$ is generated and stored in the memory. If the imaging subject did not move between step 101 in which the imaging without flash light is carried out, and step 103 in which the imaging with flash light is performed, then the difference image $F=I_2-I_1$ is equivalent to an image captured in such a way that the imaging subject is irradiated only with flash light in the situation where there is no ambient light, but only the flash light is reflected from the imaging subject, and incident to the solid-state imaging element of the camera Next, in step 202 the white balance (WB) adjustment in accordance with the color temperature of the flash light is performed with respect to the image F. In other words, the white balance (WB) adjustment is performed based on the parameter set up by adjusting the difference image data F in accordance with the flash light Furthermore, when the flash light is too bright or too dark, a level adjustment is carried out so that the brightness of the image may become optimal so as to generate a compensation image F'.

Next, in step 203 the white balance (WB) adjustment is carried out in accordance with ambient light with respect to the image data $I_1$ captured without flash light In other words, the white balance (WB) adjustment is performed based on the parameter set up by adjusting the image data $I_1$ captured without flash light in accordance with ambient light, so as to generate a compensation image $I_1'$.

This is performed by the white balance (WB) adjustment which is conventionally and widely known For example, a technology described in Japanese Patent Application Publication Number 2001-78202 may be applicable. In Japanese Patent Application Publication Number 2001-78202, the spectral distribution of object color component data and ambient light is obtained as a lighting component data from the difference image F between the image $I_2$ captured with flash light and the image $I_1$ captured without the flash light, and a spectral characteristic of a known flash Using the Lighting component data, the white balance (WB) adjustment of the image $I_1$ is carried out.

Next, in step 204, a white balance (WB) adjustment image R is generated by adding the difference image F' to the compensation image $I_1'$. According to the above steps, the white balance (WB) adjustment image R is such that the component by means of the flash light and the component by means of ambient light are independently subjected to the white balance (WB) adjustment with respect to the portion without a motion.

Figure 13:
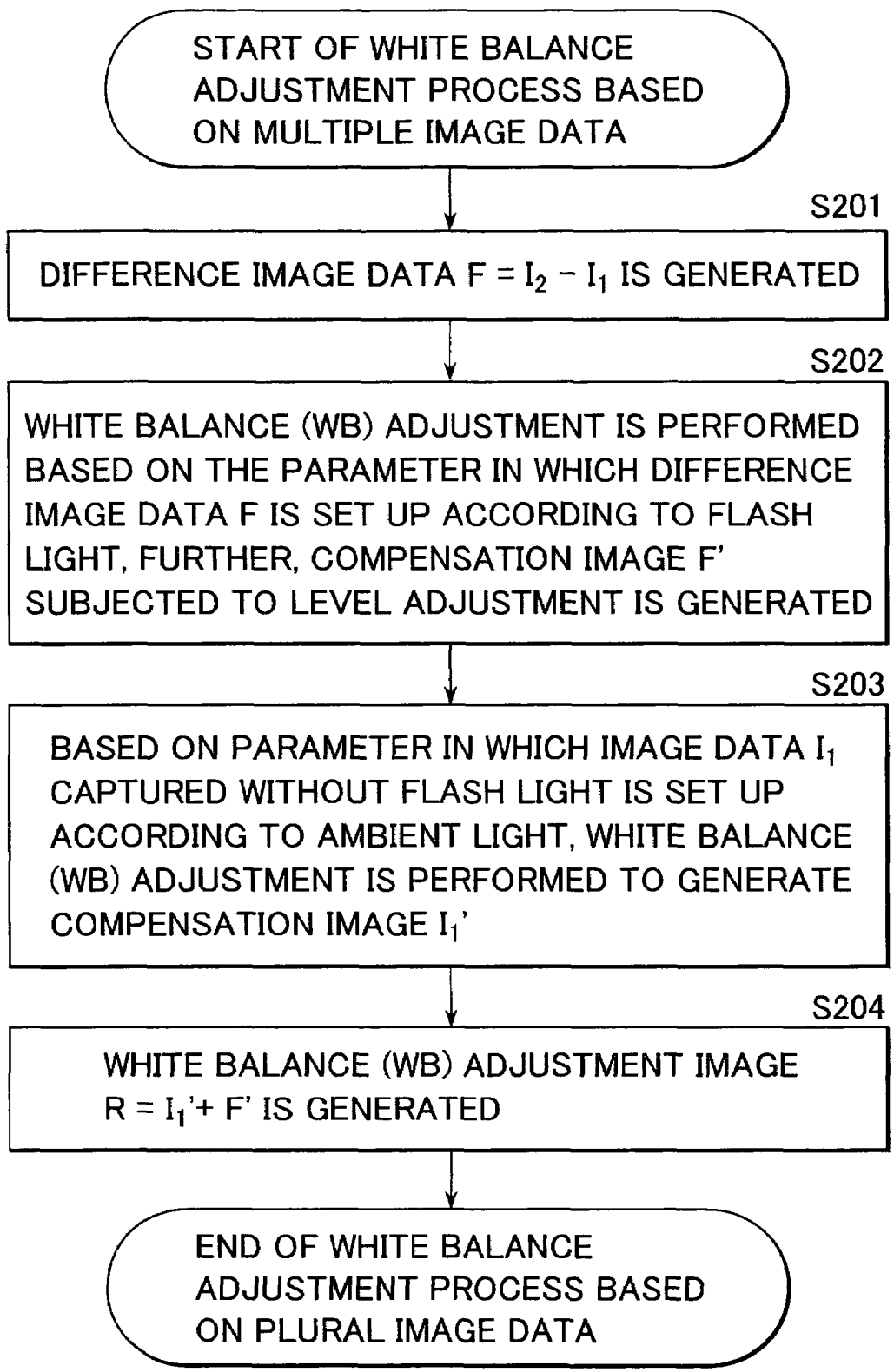
FIG. 13 is a flow chart for explaining a procedure of a white balance adjustment process based on a plurality of image data in the image data processing method of the present invention.

FIG. 14 is a chart for explaining a generation principle of the white balance (WB) adjustment image R based on two images, performed according to a flow of FIG. 13. In other words, it is a chart for explaining the generation principle of the white balance (WB) adjustment image R based on the image data $I_1$ captured without flash light and the image data $I_2$ captured with flash light.

FIG. 14(*a*) is a chart showing a pixel, as a vector V3 on an RGB space, in a coordinate position (x, y) of the image data $I_2$ captured with flash light The vector V3 has (ir, ig, ib) as a value of (R, G, B). The vector V3 is a pixel value acquired based on the irradiation light including both ambient light component and the flash light component Therefore, this vector V3 is equivalent to a sum of the vector V1 based on the pixel value in the same coordinates (x, y) acquired by imaging only with ambient light component, i.e., a pixel value of the image data $I_1$, captured without flash light, and the vector V2 which includes a pixel value component of the image captured when the imaging is carried out in a hypothetical condition of only the flash light without ambient light.

Therefore, the pixel value indicated by the vector V1 is subtracted from the vector V3, so as to acquire the pixel value of the vector V2 i.e., the pixel value of the image captured when the imaging is carried out in the hypothetical condition of only the flash light without ambient light The vector V2 of FIG. 14(b) shows this result According to the parameter set up based on the flash light component in the pixel value of the irradiation conditions of only flash light indicated by the vector V2, the white balance adjustment is performed, so as to calculate a compensation pixel value and obtain a vector V2' having the compensation pixel value. The image constructed by the pixel value indicated by his vector V2' corresponds to the compensation image F' as a result of the white balance adjustment in step 202 of FIG. 13. In other words, the processes of FIGS. 14(a) and 14(b) are equivalent to steps 201 and 202 in the flow of FIG. 13.

FIG. 14 (c) shows a process in which the white balance adjustment for the pixel value corresponding to the vector V1 based on the pixel value of the image data $I_1$ captured without flash light is carried out according to the parameter set up based on the ambient light component, so as to obtain the compensation pixel value and obtain the vector V1' having the compensation pixel value. The image constituted by the pixel values indicated by the vector V1' corresponds to the compensation image $I_1$' obtained as a result of the white balance adjustment in step 203 of FIG. 13. In other words, the process of FIG. 14 (c) is equivalent to step 203 in the flow of FIG. 13.

FIG. 14(d) shows a process in which the pixel value indicated by the vector V2' corresponding to the compensation image F' as shown in FIG. 14(b) is added to the pixel value indicated by the vector V1' corresponding to the compensation image $I_1$' as shown in FIG. 14(c) so that a white balance adjustment image data R having a final white balance adjustment pixel value is generated. In other words, the white balance adjustment pixel value at certain coordinates (x, y) is the resulting sum of the pixel value indicated by the vector V2' corresponding to the compensation image F' as shown in FIG. 14(b) and the pixel value indicated by the vector V1' corresponding to the compensation image $I_1$' as shown in FIG. 14(c). That is, the process of FIG. 14(d) is equivalent to step 204 in the flow of FIG. 13.

In this way, the white balance adjustment process in the present example of embodiment is arranged that the image containing both ambient light component and the flash light component is separated into two images, the image captured only with ambient light component and the image captured only with the flash light component The image captured only with ambient light component is subjected to the white balance adjustment according to the parameter set up based on ambient light component, and the image captured only with the flash light component is subjected to the white balance adjustment according to the parameter set up based on the flash light component, so that these compensation pixel values are added together again to obtain a final the white balance adjustment image R. In this way, the white balance adjustment is performed by means of the parameters suitable for each optical component with respect to two optical components independently, so that an accurate white balance adjustment is performed. In other words, it is possible to generate an adjusted image as if it was captured in the situation where ambient light and the flash light were the same color.

The description of steps will be continued returning to the flow of FIG. 12 When the white balance adjustment process based on a plurality of images as mentioned above in step 112 is carried out, the white balance adjustment image R is set up as a final output image, and the process is ended.

On the other hand, if the white balance adjustment process based on a plurality of images as mentioned above in step 110 is performed, then it is the case where it is determined that there is an image blur resulting from a motion of the imaging subject itself and it is determined to be possible to compensate the image blur. In step 111, among the white balance adjustment images R generated in step 110, the blur image area resulting from the motion of the imaging subject itself, i.e., the moving portion area is subjected to the pixel value compensation process. In other words, a removing process is carried out for the moving portion detected in step 107 so as to correct the white balance adjustment image R. Considering the pixel value of the image data $I_2$ captured with flash light corresponding to the portion from which the motion is detected as an input, the correction process may determine the pixel value of the portion from which the motion is detected with reference to the pixel value of the portion where there is not a motion in the white balance adjustment image R, so as to synthesize a final image, for example.

This synthesis technique will be described. A color of an object, which appears in an image, is such that light is reflected by the object, incident to an image element, and captured. For example, when a certain object is red on the image under the white light source, the object well reflects the visible light of the frequency equivalent to red, and has the accurately to absorb lights of frequencies equivalent to other colors. In other words, it can be that an object has a peculiar reflection coefficient for a light of each frequency. Now, assuming that reflecting coefficients of the light regarding the respective RGB color components of the object are represented by ($o_r$, $o_g$, $o_b$), a light of a certain color temperature is represented by ($l_r$, $l_g$, $l_b$). When the light occurred such that the light ($l_r$, $l_g$, $l_b$) is reflected by the object ($o_r$, $o_g$, $o_b$) is captured with the camera, the values ($i_r$, $i_g$, $i_b$) of the pixel which constitutes the captured image can be expressed by equation (equation 5) as shown below:

$$(i_r, i_g, i_b) = (k*l_r*o_r, k*l_g*o_g, k*l_b*o_b) \quad \text{(equation 5)}$$

In the above-mentioned equation, k is a scalar value representing an intensity of the light. Then, for example, there are a light source 1 ($l_{1r}$, $l_{1g}$, $l_{1b}$) and a light source 2 ($l_{2r}$, $l_{2g}$, $l_{2b}$) as two types of irradiation light, such as ambient light and the flash light. When the light occurred such that these two lights are reflected by a certain object ($o_r$, $o_g$, $c_b$) is captured with the camera, pixel values ($i_r$, $i_g$, $i_b$) of the captured image of the camera can be expressed by equation (equation 6) as shown below $$(i_r, i_g, i_b) = ((k_1*l_{1r}+k_2*l_{2r})*o_r, (k_1*l_{1g}+k_2*l_{2g})*o_g, (k_1*l_{1b}+k_2*l_{2b})*o_b) \quad \text{(equation 6),}$$

where $k_1$ is a scalar value representing an intensity of the light source 1, and $k_2$ is a scalar value representing an intensity of the light source 2.

Now, assuming $o_r' = k_1*o_r$, $o_g' = k_1*o_g$, and $o_b' = k_1*o_b$, the above-mentioned equation (equation 6) can be converted to equation (equation 7) as shown below.

$$(i_r, i_g, i_b) = ((l_{1r}+k'*l_{2r})*o_r', (l_{1g}+k'*l_{2g})*o_g', (l_{1b}+k'*l_{2b})*o_b') \quad \text{(equation 7),}$$

where $k' = k_2/k_1$ and k' is the light intensity scalar ratio of two light sources. That is, k' is an intensity scalar ratio of the light emitted from the light source 1 and the light source 2 in a portion of the subject captured by a pixel of interest.

Now, let us consider certain pixel values ($i_r$, $i_g$, $i_b$) which are on the image $I_2$ captured such that two types of lights, ambient light and the flash light, are reflected by the object The light source 1 in the above-mentioned equation (equation 7) is ambient light, and the light source 2 is the flash light Colors ($l_{1r}$, $l_{1g}$, $l_{1b}$) of ambient light can be measured by a conventional method used for an automatic white balance adjustment Further, since colors $l_{2r}$, $l_{2g}$, $l_{2b}$) of the flash light are peculiar to a flash device, they are known and can be set up beforehand. When k' is also known, the pixel ($i_r$, $i_g$, $i_b$) can be decomposed into ambient light components ($l_{1r}*o_r'$, $l_{1g}*o_g'$, $l_{1b}*o_b'$) and the flash light components (k'*$l_{2r}*o_r'$, k'*$l_{2g}*o_g'$, k'*$l_{2b}*o_b'$). Ambient light components and the flash light components are separated and independently subjected to a WB process. By adding together the images to be reconstructed, it is possible to remove the unnaturalness of the image caused by the differences in color temperature between ambient light and the flash light.

In the flow as described with reference to FIG. 12, with respect to the moving portion detected in step S107, the pixel value compensation in step S111 is performed according to the above-mentioned process. Hereinafter, a particular example of process will be described.

As described above, in step 107, it is detected whether or not an image blur caused by the motion of the subject itself is during the imaging of three images in steps 101, 103, and 105. The process of detecting whether or not there is any image blur caused by the motion of the subject itself is performed by comparing two images out of the three images.

As shown in FIG. 15, for example, when a ball 600 is rolling while carrying out serial imaging, (a) the image $I_1$ without flash light, (b) the image $I_2$ with flash light, and (c) the image $I_3$ without flash light, a difference image (d) $I_3-I_1$ between the image $I_1$ of (a) and the image $I_3$ of (c) is captured, and an area 610 is detected in which the image blur caused by the motion of the subject itself is generated.

Figure 16:
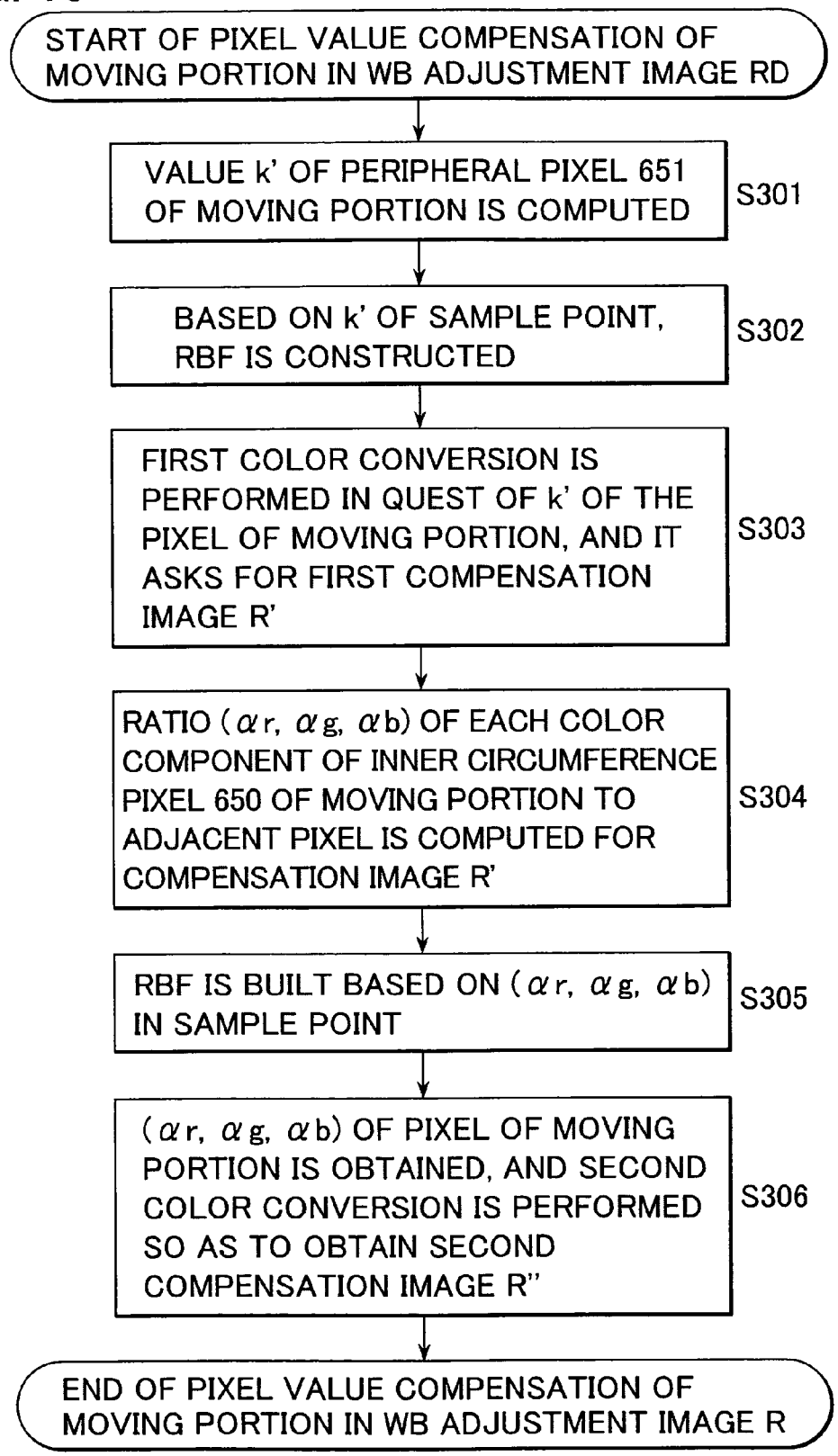
FIG. 16 is a flow chart for explaining a pixel value adjustment process of the moving portion in the imaged data process of the present invention.
Figure 17:
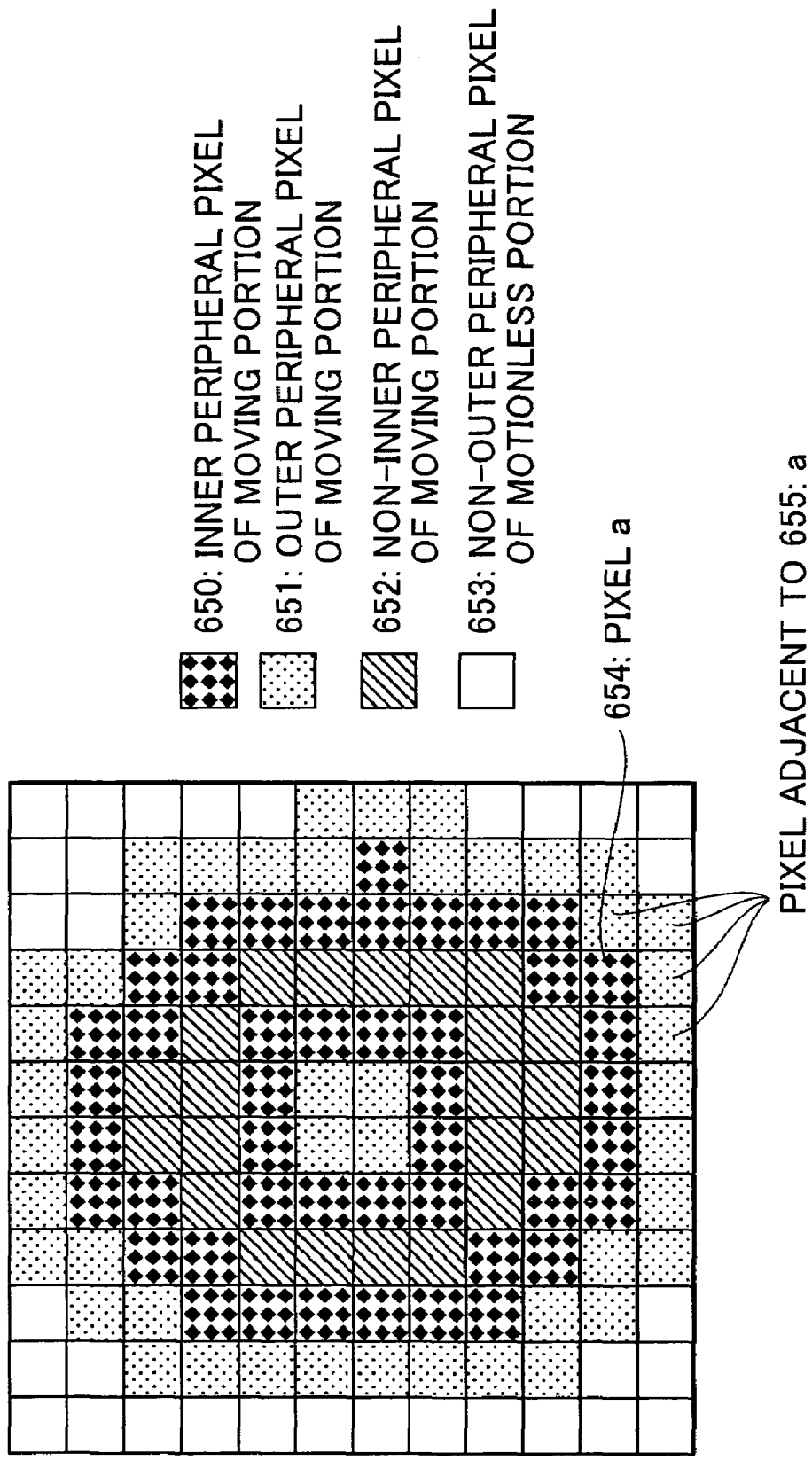
FIG. 17 is a chart for explaining the pixel value adjustment process of the moving portion in the imaged data process of the present invention.

With reference to FIGS. 16 and 17, a particular processing procedure of the pixel value compensation process of the moving portion will be described. FIG. 16 is a flow chart showing the particular processing procedure of the pixel value compensation process of the moving portion, and FIG. 17 shows the pixel area including the moving portion for compensation, which is a portion of the area 610 in FIG. 15.

As shown in FIG. 17, within an image area determined to be moving, adjacent pixels (pixels in the position included in surrounding eight pixels) of the image area determined not to be moving are defined as inner peripheral pixels 650 of the moving portion. In addition, within an image area determined to be moving, pixels other than the inner peripheral pixels 650 are moving non-peripheral pixels 652.

Further, within the image area determined not to be moving, adjacent pixels (pixels in the position included in the surrounding eight pixels) of the image area determined to be moving are defined as outer peripheral pixels 651 of the moving portion In addition, in the portion determined not to be moving in step 103, pixels other than the outer peripheral pixels 651 of the moving portion are non-peripheral pixels of the motionless portion 653.

With respect to the pixel of the moving portion, a ratio of the intensity (scalar value) $k_1$ of the light source 1 (ambient light) to the intensity (scalar value) $k_2$ of the light source 2 (flash light), i.e., a value of the light intensity scalar ratio $k'=k_2/k_1$, is unknown. Now, it is assumed that an image which is correctly subjected to the target white balance (WB) adjustment and the moving portion is compensated has a pixel structure in which the pixel values of the moving portion and the motionless portion change smoothly. Under this assumption, the value of the light intensity scalar ratio k' is calculated with respect to the outer peripheral pixels 651 of the moving portion. With respect to the outer peripheral pixels 651 of the moving portion, since ambient light components ($l_{1r}*o_r'$, $l_{1g}*o_g'$, and $l_{1b}*o_b'$) in the above-mentioned equation (equation 7) are equal to the values of the corresponding pixel in the image data $I_1$ captured without the flash light, the value of the light intensity scalar ratio $k'=k_2/k_1$ can be calculated based on the pixel value ($i_r$, $i_g$, $i_b$) of the image data $I_2$ captured with the flash light and equation (equation 7). A calculation process of the ratio: $k'=k_2/k_1$ of the intensity (scalar value) $k_1$ of the light source 1 (ambient light) to the intensity (scalar value) $k_2$ of the light source 2 (flash light) with respect to the outer peripheral pixels 651 of the moving portion 651 is a process in step 301 of FIG. 16.

According to the process in step 301, the light intensity scalar ratio k' can be calculated with respect to the outer peripheral pixels 651 of the moving portion. However, the value of light intensity scalar ratio k' corresponding to the pixel included in the moving portion is unknown. The value of light intensity scalar ratio k' corresponding to the pixel included in the moving portion is interpolated from the value of k' calculated corresponding to the outer peripheral pixels 651 of the moving portion. The process given as an example of an interpolating method is a process using the radial basis function (RBF: Radial Basis Function). A document regarding data interpolation using the RBF, may be J. C. Carr, et al, and "Reconstruction and Representation of 3D Objects with Radial Basis Function" ACM SIGGRAPH 2001, Los Angeles, Calif., pp 67-76, and 12-17 Aug. 2001, for example.

The Radial Basis Function (radial basis function) means a function where a value decreases (or increases) in monotone as a distance from a central point increases, a contour line becomes a hyper sphere (a circle or an ellipse in two dimensions). In order to solve a problem of estimating a value of a height of an unknown point by constructing a function by which a line passes through a sample point whose height is known, and becomes as smooth as possible, it is already known that the RBF's centered on a known sample point may only be superimposed. In particular, when the sample point is on a two dimensional space, let the sample point be $\{\vec{c}_i=(c_i^x,c_i^y)\}(1\leq i\leq n)$ (where $c_i^x,c_i^y$ respectively indicate an x-coordinate value and y-coordinate value in a sample point i), and let heights in respective points be $\{h_i\}(1\leq i\leq n)$, then a desired function $f(\vec{x})$ is expressed by the following equation (equation 8) using the RBF.

$$f(\vec{x}) = p(\vec{x}) + \sum_{j=1}^{n} d_j \phi(\vec{x}-\vec{c}_j) \quad \text{(equation 8)}$$

where $p(\vec{x})=p_0+p_1x+p_2y$. In addition, there is $\phi(\vec{x})=|\vec{x}|$ or $\phi(\vec{x})=|\vec{x}|^2\log|\vec{x}|$ etc., as an example of a basis function $\phi(\vec{x})$. However, it cannot specify $\{d_i\}(1\leq i\leq n),\{p_i\}(0\leq i\leq 2)$ only by the above-mentioned equation (equation 8). Then, $\{d_i\}(1\leq i\leq n)$, $\{p_i\}(0\leq i\leq 2)$ is calculated to satisfy the following equation (equation 9).

$$\sum_{j=1}^{n} d_j = \sum_{j=1}^{n} d_j c_j^x = \sum_{j=1}^{n} d_j c_j^y = 0 \quad \text{(equation 9)}$$

Therefore, (unknown number n+3, equation number n+3) $\{d_i\}(1\leq i\leq n)$, $\{p_i\}(0\leq i\leq 2)$ can be calculated from $$f(\vec{c}_i) = p(\vec{c}_i) + \sum_{j=1}^{n} d_j \phi(\vec{c}_i - \vec{c}_j)$$

and equation (equation 9).

If $f(\vec{x})$ is constructed by assuming the light intensity scalar ratio k' in the outer peripheral pixels 651 of the moving portion is a sample, the light intensity scalar ratio k' in an arbitrary position can be calculated. This process is an RBF construction process based on the light intensity scalar ratio k' (k' in the outer peripheral pixels 651 of the moving portion) of the sample point in step 302 in FIG. 16.

By way of the RBF construction process, a ratio of the intensity (scalar value) $k_1$ of the light source 1 (ambient light) to the intensity (scalar value) $k_2$ of the light source 2 (flash light) which correspond to each pixel on the image data $I_2$, captured with flash light, of the portion which is determined to be moving, i.e., the light intensity scalar ratio k': k' $=k_2/k_1$ corresponding to each pixel included in the moving portion is presumed. By using the presumed light intensity scalar ratio k' corresponding to each pixel, a moving area portion of the image $I_2$ is decomposed into ambient light component and the flash component, and the white balance (WB) adjustment process is respectively performed in accordance with the color temperature of each light In other words, since the light intensity scalar ratio k' can be calculated in each pixel position of the moving portion, the k', the pixel value $(i_r, i_g, i_b)$ in each pixel position of the image data $I_2$ captured with flash light and the known light components $(1_{1r}, 1_{1g}, 1_{1b})$ of the light source 1 (ambient light) and the light components $(1_{2r}, 1_{2g}, 1_{2b})$ of the light source 2 (flash light) are substituted into the above-mentioned equation (equation 7), so that the reflection coefficient $(o_r', o_g', o_b')$ of the subject based on only the light source 1 (ambient light) is obtained.

Further, the pixel value: $(1_{1r}*o_r', 1_{1g}*o_g', 1_{1b}*o_b')$ of the subject when irradiated only with ambient light component and the pixel value: $(k'*1_{2r}*o_r', k'*1_{2g}*o_g', k'*1_{2b}*o_b')$ of the subject when irradiated only with the flash light component are calculated and each subjected to two white balance adjustments by setting up independent parameters according to respective light components as previously described with reference to FIG. 13 and FIG. 14. By way of a re-composing process of the adjustment data, the final white balance adjustment pixel value is calculated.

In summary, the procedure of compensation of the pixel value of the moving portion is the following a-f processes.

a Firstly, as data corresponding to the pixel of the motionless portion adjacent to the moving potion, the light intensity scalar ratio between two types of the lights is calculated, which are the light emitted only from the above-mentioned first light source and the light emitted only from ambient light without the above-mentioned first light source, in pixel of a portion of the captured subject.

b. By using the radial basis function (RBF: Radial Basis Function), the light intensity scalar ratio corresponding to each pixel of the moving portion is calculated.

c. Based on the light intensity scalar ratio corresponding to each pixel of the moving portion, the pixel value of each pixel of the moving portion in the image equivalent to the image captured under an irradiation environment with only the first light source is calculated as the first pixel value.

d. Based on the light intensity scalar ratio corresponding to each pixel of the moving portion, the pixel value of each pixel of the moving portion in the image equivalent to the image captured under an ambient light irradiation environment not including the first light source is calculated as the second pixel value.

e. The pixel value adjustment process (white balance adjustment) is performed based on the first pixel value, and the pixel value adjustment process (white balance adjustment) is performed based on the second pixel value.

f. Two generated adjustment pixel values are added together.

Thus, the white balance (WB) adjustment pixel value with respect to the pixel included in the moving portion overwrites the image data R generated in step 110 of FIG. 12, so as to obtain the first compensation image data R'. In other words, only the pixel value with respect to the moving area caused by the motion of the subject is reset for the captured image in step 111, and overwrites the white balance adjustment image R generated in step 110, so as to obtain the first compensation image data R'.

In addition, as described in the processing flow of FIG. 13, when level compensation (S202) of the flash light is performed, the white balance adjustment pixel values based on ambient light component and the flash light component are added together, after performing equivalent level adjustment also when the pixel value of the moving portion is calculated.

Thus, the pixel value of the moving portion is reset, and the pixel corresponding to the moving portion area of the image R is rewritten. This process is the process in step 303 of FIG. 16.

However, in the first compensation image R' obtained in such a way that the pixel value reset in the above-mentioned moving area overwrites the white balance adjustment image R which is already generated in step 110, a boundary may not be smooth between the reset pixel of the moving portion and the pixel of the motionless portion of the original image R. One reason is that the color of ambient light may not have been measured correctly. Another reason is that the whitening may have occurred in the image $I_2$ captured with flash light etc. Then, in order to take care of such cases, a further color conversion process of setting up the boundary portion smoothly is performed.

In particular, the processes in steps 304-306 in FIG. 16 are performed. In step 304, firstly, each color component ratio $(\alpha_r, \alpha_g, \alpha o_b)$ is calculated between the pixel value of a certain pixel a 654 (see FIG. 17) out of the inner peripheral pixels 650 of the moving portion in the first compensation image R' and the average of the value in the first compensation image R' of the outer peripheral pixels (pixels 655 in FIG. 17) of the moving portion out of the pixels (pixels in the position included in eight surrounding pixels) adjacent to the pixel a 654. The ratio is saved as a color component ratio data corresponding to the pixel a 654. Similarly, the ratio $(\alpha_r, \alpha_g, \alpha_b)$ of each color component corresponding to each pixel in all the positions of the inner peripheral pixels 650 in the moving portion as the color component ratio data corresponding to the pixel is calculated, and saved as the color component ratio data corresponding to each pixel. Next, in step 305 the RBF based on the color component ratio data is built, using all the inner peripheral pixels 650 in the moving portion as the sample points.

Finally, in step 306, with respect to each pixel of the moving portion, according to the RBF based on the built color component ratio data, the color component ratio data $(\alpha_r, \alpha_g, \alpha_b)$ corresponding to each pixel of the moving portion is calculated, and the pixel value of each pixel set up in the first compensation image R' is multiplied by the color component ratio data ($\alpha_r$, $\alpha_g$, $\alpha_b$) of the correspondence pixel, so that a new pixel value is obtained and a second color conversion is performed regarding the pixel value as the pixel of the moving portion. The second compensation image R" obtained by performing the second color conversion process is the output image. This process is the process in step 306 of FIG. 16.

In addition, in the first compensation image R' obtained by performing process up to step 303 in FIG. 16, when the boundary between the image of the moving portion and the image of the motionless portion has a smooth connection, the process of step 304 to step 306 may be omitted.

In the above description, with respect to a method in which the value given at the sample point is interpolated at other points, a method of using the RBF is described, however other method may be used for interpolating. The above process is the particular example of process of step 111 in FIG. 12. Thus, when the image blur based on the motion of the subject itself is detected from serially captured images, the process according to the flow as shown in FIG. 16 is performed, and the second compensation image R" or the first compensation image R' generated by the above-mentioned process is the last output image.

In addition, when it is known beforehand that there is no motion of the subject itself, the processes of steps 107 to 111 in FIG. 12 become unnecessary. Further, since a judgment of step 108 is always "NO", it is not necessary to perform the judgment process of step 108, therefore steps 105 and 106 which create and store the data used for the judgment in step 108 are unnecessary.

Thus, when it is known beforehand that there is no motion of the subject itself, the image $I_3$ captured without flash light in step 105 is an unnecessary image. In this case, only two images of the image $I_1$ captured without flash light and the image $I_2$ captured with flash light may be captured.

Moreover, it is described using a tern called a flash as an illuminating apparatus which emits light when the subject is dark. In addition to this, it is often referred to as the strobe light, it is not limited to the flash, so that the present invention is applied to the illuminating apparatus which generally emits light when the subject is dark.

As described above, in the example of preferred embodiment, with respect to the image captured being irradiated with a plurality of different lights, the flash, ambient light, etc., the image captured under a single irradiation light environment is acquired and generated; with respect to the images under the respective single irradiation light environments, the white balance adjustment process according to the parameter set up based on the color component (color temperature) of respective irradiation light is performed; by synthesizing these, the accurate white balance adjustment process in which the difference in the color temperature of the flash and ambient light is reduced is realizable.

Figure 18:
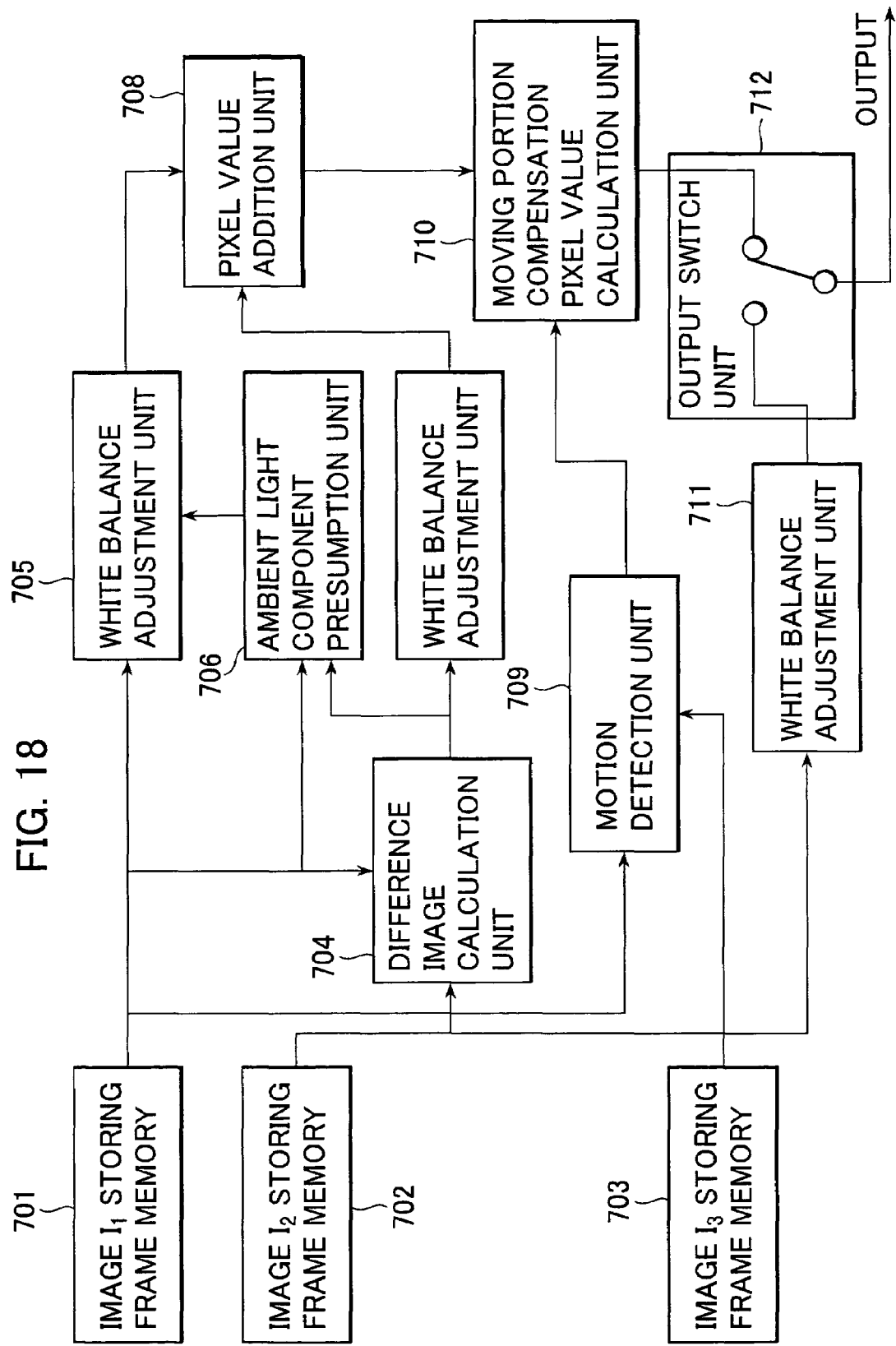
FIG. 18 is a diagram for explaining a mechanism in which the pixel value adjustment process based on the plurality of image data in the imaged data process of the present invention is performed.

FIG. 18 is a block diagram showing a functional structure of the digital signal processing unit (DSP) (equivalent to DSP 506 of FIG. 11) which performs a process according to the example of preferred embodiment.

The process in the digital signal processing unit (DSP) as shown in FIG. 18 will be described and contrasted with the flow chart as shown in FIG. 12.

The image $I_1$ without flash light, the image $I_2$ with flash light, and the image $I_3$ without flash light which are captured in steps 101-106 of FIG. 12 are stored in frame memories 701, 702, 703, respectively. In addition, a memory built in the digital signal processing unit (DSP) or the memory (memory 512 in FIG. 11) connected to a bus may be applicable to the frame memory for image storing.

A motion detecting process in step S107 is performed in a motion detection unit 709. This is performed as a detection process by means of the difference data based on the image $I_1$ without flash light and the image $I_3$ without flash light, as previously described with reference to FIG. 15.

The white balance adjustment process based on a plurality of image data in step 112 is the process as previously described with reference to FIG. 13 and FIG. 14.

Firstly, based on the image $I_1$ without flash light and the image $I_2$ with flash light, the difference image data $F=I_2-I_1$ is calculated in a difference image calculation unit 704 (FIG. 13, S201). Next, the difference image data $F=I_2-I_1$ i.e., the image F equivalent to the image captured being irradiated only with the flash light is subjected to the white balance adjustment process according to the parameter set up based on the component of the flash light in a white balance adjustment unit 707 (FIG. 13, S202). Furthermore, the white balance adjustment process according to the parameter set up based on an estimate value of ambient light component estimated in an ambient light component presuming unit 706 is carried out for the image $I_1$ without flash light in a white balance adjustment unit 705 (FIG. 13, S203).

Furthermore, the pixel values of two images captured by these two white balance adjustment processes are added together in a pixel value adding unit 708 (FIG. 13, S204).

When the moving portion is not included in the captured image, the process is not carried out in a moving portion compensating pixel value calculation unit 710, but the image data having the pixel value added in the pixel value adding unit 708 is outputted through an output switch unit 712 as a white balance adjustment image. Destinations are a D/A converter 508 (see FIG. 11) which performs digital-to-analog conversion, the codec 511 which performs an encoding process, etc.

On the other hand, when the moving area of the subject itself is detected as a result of the motion detection by way of the difference data based on the image $I_1$ without flash light and the image $I_3$ without flash light in the motion detection unit 709. Furthermore, in the moving portion compensating pixel value calculation unit 710, the compensation (conversion) of the pixel value of the moving portion as previously described with reference to FIG. 16 and FIG. 17 is performed, the image having the pixel value data in which the moving portion is replaced by the compensation pixel value is outputted through the output switch unit 712.

The white balance adjustment unit 711 performs a process in step 113 in the processing flow of FIG. 12. In other words, when the moving area is detected in the motion detection unit 709, but if it is determined that the compensation is impossible, because a proportion of the moving area in the whole image is large, etc., then the image $I_2$ with flash light is inputted, and the white balance adjustment according to a predetermined parameter is performed, so as to output it through the output switch unit 712.

In addition, the structure illustrated in FIG. 18 shows each processing unit separately in order to explain the function, but the actual process can be performed by the processor in the DSP, according to the program which performs a process in accordance with each processing flow as described above.

(Second Example of Embodiment of White Balance Adjustment Process)

In the above-mentioned white balance adjustment process, as described with reference to FIG. 13 and FIG. 14, a single irradiation light image data for each of ambient light component and the flash light component is calculated. With respect to the image data, the example of structure is described in which the white balance adjustment process is carried out according to the parameter set up based on ambient light component and the flash light component.

Next, with respect to the difference image data $F=I_2-I_1$ corresponding to the irradiation light condition of the flash light only, an example of structure will be described in which the white balance adjustment process is carried out according to the parameter set up based on ambient light component.

Figure 19:
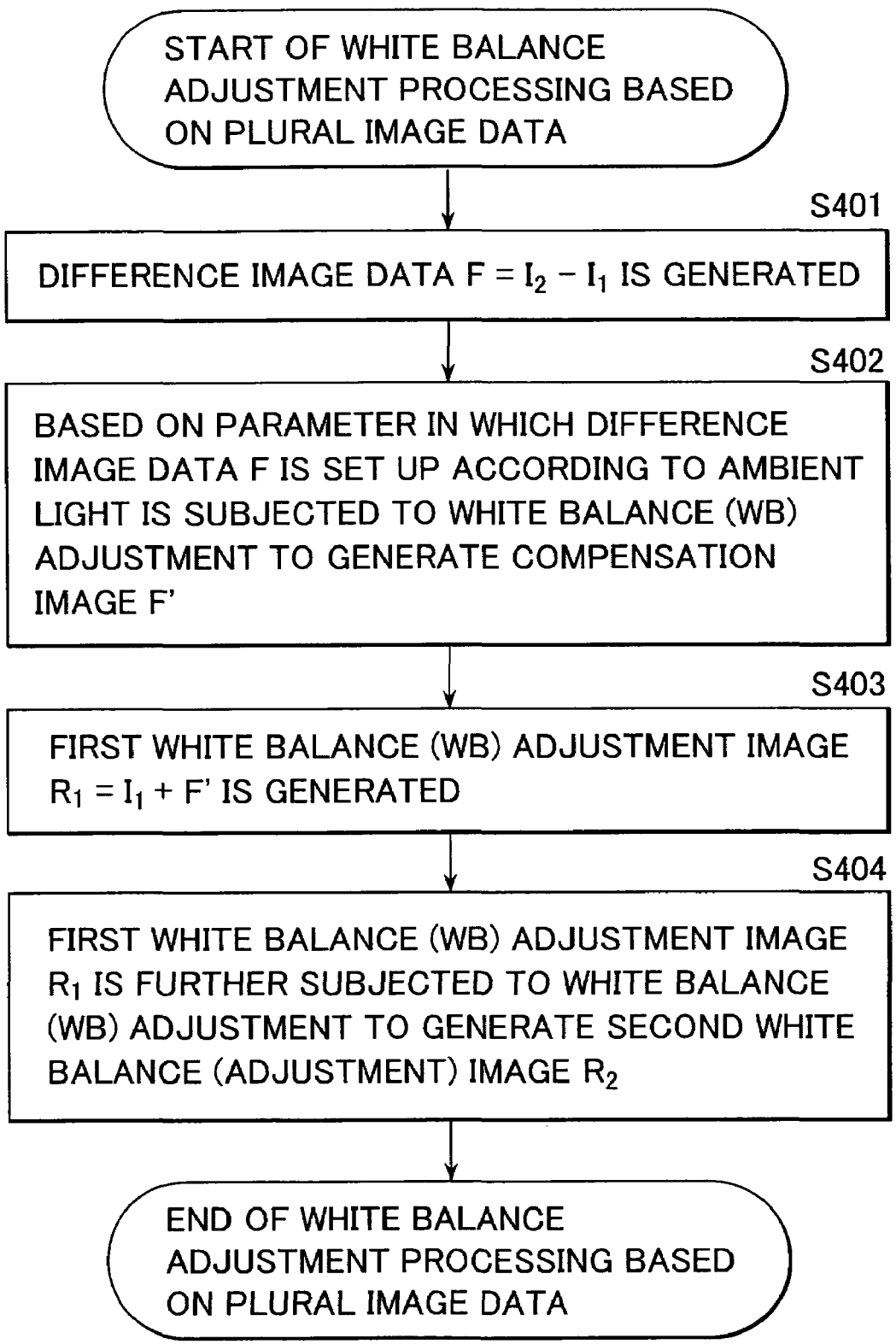
FIG. 19 is a flow chart for explaining a procedure of the white balance adjustment process based on the plurality of image data in the image data processing method of the present invention.

A white balance adjustment processing flow based on the plurality of image data of the present example of embodiment equivalent to the flow in FIG. 13 in the previous example of embodiment is shown in FIG. 19.

In step 401, a difference in each color component between the pixel of the image data $I_2$ captured with flash light and the pixel of the image $I_1$, captured without flash light is obtained to generate the difference image $F=I_2-I_1$ to be stored in the memory. The difference image $F=I_2-I_1$ is equivalent to the image captured in such a way that the imaging subject is irradiated only with flash light in the situation where there is no ambient light, but only the flash light is reflected from the imaging subject, and incident to the solid-state imaging element of the camera. Next, in step 402, with respect to the image F, the white balance (WB) adjustment in accordance with the color temperature of ambient light is performed to generate the compensation image F'. That is, the white balance (WB) adjustment is performed based on the parameter set up such that the difference image data F is matched to the color temperature of ambient light, so as to generate the compensation image F'.

In this case, allowing a direct comparison between respective pixels of the difference image F and the image $I_1$ captured without flash light, the white balance adjustment process is performed so that the flash light may match the color of ambient light As a particular example of this WB process, using the pixel $(r_i, g_i, b_i)$ of the image $I_1$ captured without flash light, the pixel being in the same position as the pixel $(r_f, g_f, g_f)$ of the difference image F, the components R, B of the pixel of the difference image F are matched to a level of a G signal of the pixel of the image $I_1$ captured without flash light, then the pixel value conversion using the following (equation 10) (equation 11) is carried out.

$$r_f'=r_f*(g_i/g_f) \quad \text{(equation 10)}$$

$$b_f'=b_f*(g_i/g_f) \quad \text{(equation 11)}$$

Then, the next value is obtained by comparing $r_f'$ with $r_i$ and $b_f'$ with $b_i$.

$$a_r=r_i/r_f'=(r_i*g_f)/(r_f*g_i) \quad \text{(equation 12)}$$

$$a_b=b_i/b_f'=(b_i*g_f)/(b_f*g_i) \quad \text{(equation 13)}$$

The WB parameter is calculated by averaging $a_r$ and $a_b$ obtained by using the above-mentioned (equation 12) and (equation 13) for all pixels. By multiplying the obtained parameter by an R component and a B component of each pixel of the image F, the white balance adjustment is performed. According to this process, the image F is converted into an image appearing as if it was captured being irradiated with the flash light of the same color as ambient light so as to be saved as the image F'.

Furthermore, in step 403, the difference image F' and the image $I_1$ captured without flash light are synthesized so as to generate a first white balance adjustment image $R_1$. The first white balance adjustment image $R_1$ becomes an image whose color temperature of ambient light and the flash light are matched to each other.

Finally, in step 404, the white balance adjustment is performed with respect to the first white balance adjustment image $R_1$, and a second white balance adjustment image $R_2$ is further generated.

The value set up by the user may be used for the parameter of the WB in step 404. By using a well-known automatic white balance technology, it may be changed so that the final second white balance adjustment image $R_2$ may have a natural tone.

By way of the process according to the example of preferred embodiment, the white balance adjustment emphasizing a component of ambient light is attained. In particular, when ambient light is reddish due to an evening glow etc., that is, there is a higher R component, the adjustment according to ambient light, such as adjusting the whole to a reddish tone, is attained.

Figure 20:
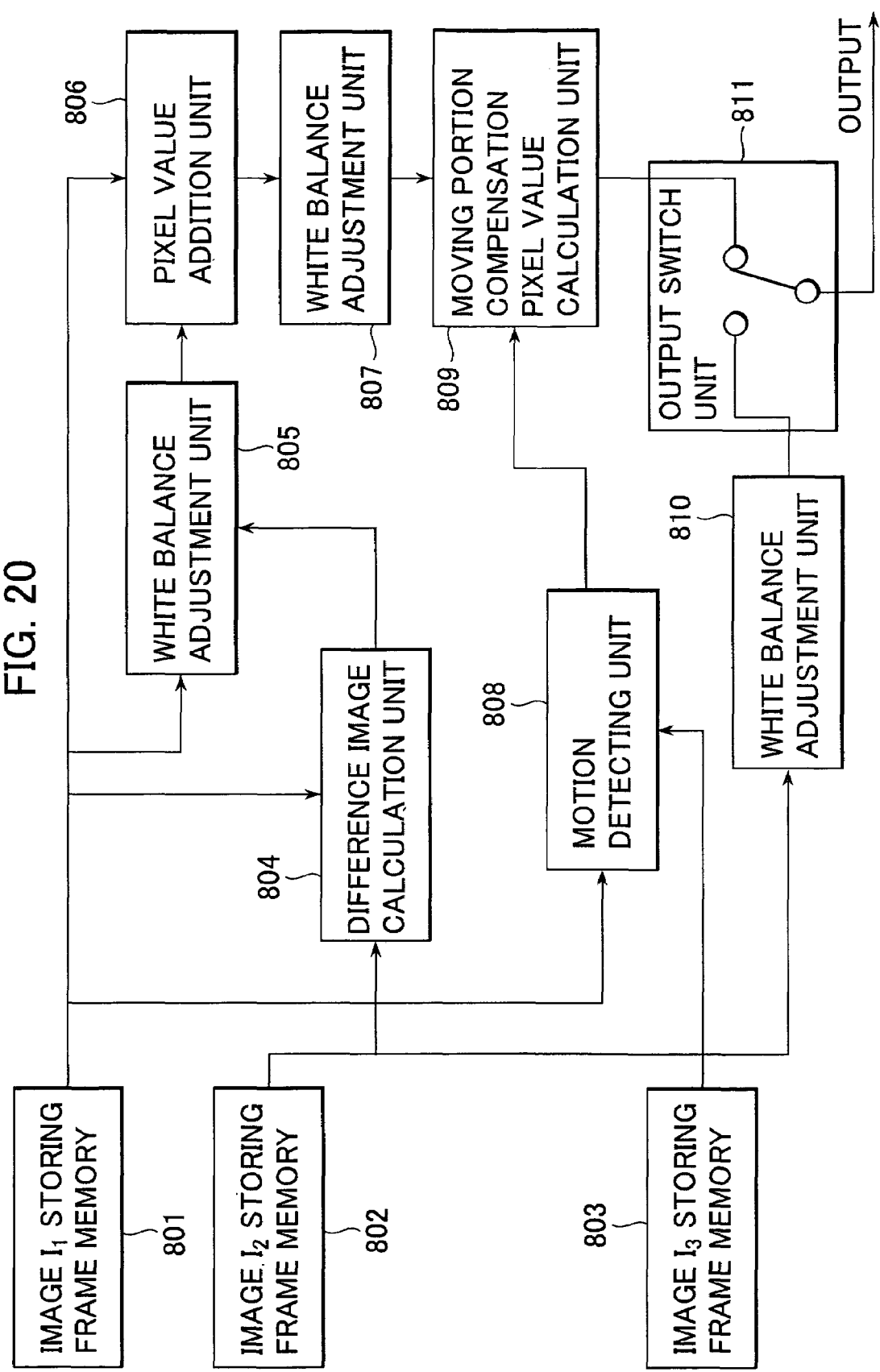
FIG. 20 is a diagram for explaining the mechanism in which pixel value adjustment process based on the plurality of image data in the imaged data process of the present invention is performed.

FIG. 20 is a block diagram showing a functional structure of the digital signal processing unit (DSP) (equivalent to the DSP 506 in FIG. 11) which performs a process according to the example of preferred embodiment.

The process in the digital signal processing unit (DSP) as shown in FIG. 20 will be described and contrasted with a flow chart as shown in FIG. 19.

The image $I_1$, without flash light, the image $I_2$ with flash light, and the image $I_3$ without flash light which are captured in steps 101-406 of FIG. 12 are stored in frame memories 801, 802, 803 respectively.

Based on the image $I_1$, without flash light and the image $I_2$ with flash light, the difference image data $F=I_2-I_1$ is calculated in a difference image calculation unit 804 (FIG. 19, S401). Next, the difference image data $F=I_2-I_1$, i.e., the image F equivalent to the image captured under the irradiation conditions of the flash light only, the white balance adjustment process according to the parameter set up based on the component of ambient light is performed (FIG. 19, S402) in a white balance adjustment unit 805. Furthermore, the pixel value of the compensation image F' captured by this white balance adjustment process and the image $I_1$ without flash light are added together in the pixel value adding unit 806, and the first white balance adjustment image $R_1$ is generated (FIG. 19, S403). Furthermore, in the white balance adjustment unit 807, the white balance adjustment is performed with respect to the first white balance adjustment image $R_1$, and the second white balance adjustment image $R_2$ is generated.

When the moving potion is not included in the captured image, the process is not performed in a moving portion compensating pixel value calculation unit 809, the second white balance adjustment image R2 is outputted as the white balance adjustment image through an output switch unit 811. Destinations are the D/A converter 508 (see FIG. 11) which performs digital-to-analog conversion, the codec 511 which performs the encoding process, etc.

On the other hand, when the moving area of the subject itself is detected as a result of the motion detection by way of the difference data based on the image $I_1$, without flash light and the image $I_3$ without flash light in a motion detection unit 808. Furthermore, in the moving portion compensating pixel value calculation unit 809, the compensation (conversion) of the pixel value of the moving portion as previously described with reference to FIG. 16 and FIG. 17 is performed, the image having the pixel value data in which the moving portion is replaced by the compensation pixel value is outputted through the output switch unit 811.

The white balance adjustment unit 810 performs the process in step 113 in the processing flow in FIG. 12. In other words, when the moving area is detected in the motion detection unit 808, but if it is determined that the compensation is impossible, because a proportion of the moving area in the whole image is large, etc., then the image $I_2$ with flash light is inputted, and the white balance adjustment according to a predetermined parameter is performed, so as to output it through the output switch unit 811.

In addition, the structure illustrated in FIG. 20 shows each processing unit separately in order to explain the function, but the actual process can be performed by the processor in the DSP, according to the program which performs a process in accordance with each processing flow as described above.

According to the example of preferred embodiment, the white balance adjustment which emphasizes the component of ambient light can be attained.

With reference to specific embodiments, the present invention has been described in detail, however, it is obvious that one skilled in the art may modify or replace the examples of preferred embodiments without departing from the scope of the present invention. In other words, the present invention has been disclosed by way of example, so that the description should not be construed as limiting, and the appended claims are to be construed to determine the features of the present invention.

In addition, a series of processes as described in the specification can be performed by way of hardware, software, or a combination of these. When carrying out a process by way of software, a program having recorded a processing sequence can be installed in a memory in a computer built in a dedicated hardware device, or alternatively it is possible to make a general purpose computer which can perform various processes install and perform the program.

For example, the program can be recorded beforehand in a hard disk or the ROM (Read Only Memory) as a recording medium. Alternatively, the program can permanently or temporarily be stored (recorded) in a removable recording medium, such as a flexible disk, a CD-ROM (Compact Disc Read Only Memory), an MO (Magneto optical) disk, a DVD (Digital Versatile Disc), a magnetic disk, a semiconductor memory, etc. Such a removable recording medium can be provided as so-called packaged software.

In addition, the program can be installed in a computer through a removable recording medium as described above, wirelessly transmitted to the computer from a download site, or transmitted to the computer through a wired line or via a network, such as a LAN (Local Area Network), the Internet, etc. The computer can receive the thus transmitted program to be installed in the recording media, such as a built-in hard disk.

In addition, various processes as described in the specification may not only be performed in chronological order according to the description but also be carried out in parallel or individually, as needed or according to throughput capacity of a device which performs the process. Further, in this specification, a system means a logical group structure of a plurality of devices, so that every device is not necessarily provided in the same casing.

INDUSTRIAL APPLICABILITY

As described above, according to the structures of the present invention it becomes possible to accurately adjust the white balance with respect to the images captured under an environment where different light components, such as ambient light, flash light, etc., are mixed, and to acquire the image data of natural tones.

Further, according to the structures of the present invention, since it is constructed such that, with respect to the image to be captured under the plurality of different types of irradiation light, such as ambient light, and the flash light, the image is captured or generated in an environment of single light irradiation, and the white balance adjustment according to the parameter set up based on the color component (color temperature) of each type of irradiation light is carried out with respect to the image under each single irradiation light environment, so as to synthesize them, whereby the accurate white balance adjustment process in which the difference in color temperature between the flash light and ambient light is reduced can be realized.

Furthermore, according to the structures of the present invention, since it is constructed such that, with respect to the moved portion of the subject itself, the pixel value is adjusted and set up based on adjacent pixel values of the motionless portion, it becomes possible to generate a natural image data with smooth changes between pixels.

Furthermore, according to the structures of the present invention, it is possible to provide the suitable pixel value compensation with respect to the image data in which the pixel value of the subject image is saturated because the subject dose to the imaging means is excessively irradiated with the irradiation light, such as a stroboscope attached to the imaging means, such as a camera.

Further, according to the structures of the present invention, the temporary compensation pixel value of the saturation pixel value is obtained based on the plurality of image data under the different exposure conditions, and the temporary compensation pixel value is subjected to the normalization process so as to be corrected again to the outputable pixel value then outputted or recorded, whereby the dear image data can be outputted and stored based on an accurate compensation pixel value calculation and the compensation pixel value.

Furthermore, according to the structures of the present invention, the plurality of image data are inputted that include the first image data to be compensated and having the saturation pixel where at least part of pixels in the image data is set up as the maximum pixel value, and one or more sub-image data captured under the exposure condition different from that for the first image data; based on corresponding pixel value differences in the plurality of input image data, the exposure condition difference data is acquired which indicates the difference in the exposure condition at the time of acquiring each image data; based on the exposure condition difference data, the temporary compensation pixel value of the saturation pixel in the above-mentioned first image data is calculated; and the normalization process is carried out for correcting the temporary compensation pixel value to the pixel value within an outputable range, thus outputting and storing the clear image data based on the accurate compensation pixel value calculation and the compensation pixel value.

The invention claimed is:

1. A captured image data processing method comprising:
    subtracting, from a pixel value of a second image data acquired by way of an imaging process causing a first light source to emit light, a pixel value of a corresponding pixel of first image data acquired by way of an imaging process causing the first light source not to emit light;
    obtaining difference image data corresponding to an image captured in an irradiation environment of only the first light source based on the subtraction;
    performing a white balance adjustment process on the difference image data;

adding pixel values of pixels in the difference image data to corresponding pixel values of the first image data; and generating a final pixel value adjustment image based on the addition of the difference image data and the first image data.

2. The captured image data processing method according to claim 1, further including:

performing a pixel value adjustment process on the first image data.

3. The captured image data processing method according to claim 2, wherein the white balance adjustment process performed on the difference image data is performed according to a parameter based on an light component of the first light source, and the pixel value adjustment process performed on the first image data is a white balance adjustment process according to a parameter based on an ambient light component which does not contain the first light source.

4. The captured image data processing method according to claim 3, wherein the parameter is represented by a 3×3 matrix, the matrix applied for conversion of color components which constitute colors of pixels.

5. The captured image data processing method according to claim 4, wherein the 3×3 matrix is a matrix set as 0 with exception to diagonal components.

6. The captured image data processing method according to claim 1, wherein performing the white balance adjustment process comprises performing the process on the difference image data according to a parameter based on ambient light component which does not contain the first light source.

7. The captured image data processing method according to claim 1, further including:

detecting a moving portion where a subject moves according to difference data of a plurality of image data; and performing a pixel value adjustment process with respect to the moving portion.

8. The captured image data processing method according to claim 7, wherein detecting a moving portion further comprises:

calculating a light intensity scalar ratio of two light sources when the first light source is caused or not caused to emit light, as data corresponding to a pixel of a motionless portion adjacent to a moving portion;

using a radial basis function (RBF) to calculate a light intensity scalar ratio corresponding to pixels of the moving portion;

calculating a first pixel value of the pixels of the moving portion in an image which is equivalent to the image captured in an irradiation environment of the first light source only, based on the light intensity scalar ratio corresponding to the pixels of the moving portion;

calculating a second pixel value of the pixels of the moving portion in an image which is equivalent to the image captured in an ambient light irradiation environment where the first light source is not included, based on the light intensity scalar ratio corresponding to the pixels of the moving portion;

performing the pixel value adjustment process, based on the first pixel value, to create a first adjustment pixel value;

performing the pixel value adjustment process, based on the second pixel value, to create a second adjustment pixel value; and adding the first and second adjustment pixel values.

9. The captured image data processing method according to claim 8, wherein the pixel value adjustment processing performed based on the first pixel value is a white balance adjustment process according to a parameter based on a light component of the first light source; and the pixel value adjustment processing performed based on the second pixel value is a white balance adjustment process according to a parameter based on an ambient light component which does not contain the first light source.

10. The captured image data processing method according to claim 7, wherein detecting a moving portion further comprises:

calculating a color component ratio $(\alpha_r, \alpha_g, \alpha_b)$ of a pixel value of an inner peripheral pixel of the moving portion to an average pixel value of outer peripheral pixels of the moving portion adjacent to the inner peripheral pixel of the moving portion;

constructing a radial basis function (RBF) based on the color component ratio corresponding to pixels by considering the inner peripheral pixels in the moving portion as sample points; and calculating the color component ratio corresponding to pixels of the moving portion, based on the radial basis function (RBF); and multiplying the color component ratio with an image to be compensated and obtaining a compensation pixel value.

11. The captured image data processing method according to claim 1, further including:

detecting a moving portion where a subject moves according to difference data of a plurality of image data; and performing the pixel value adjustment process based on the second image data acquired by way of an imaging process causing the first light source to emit light when a proportion of the whole image of the moving portion is higher than a predetermined threshold value;

wherein data produced based on the pixel value adjustment process based on the second image data is set as a final pixel value adjustment data.

12. The captured image data processing method according to claim 11, wherein the pixel value adjustment process based on the second image data is either a white balance adjustment process according to a parameter based on a light component of the first light source, the white balance adjustment process according to a parameter based on ambient light component not containing the first light source, or a white balance adjustment process according to a parameter based on an intermediate light component between the first light source and ambient light component not containing the light component of the first light source.

13. A captured image data processing apparatus comprising:

a memory for storing first image data acquired by way of an imaging process causing a first light source not to emit light, and a second image data acquired by way of an imaging process causing the first light source to emit light; and a data processing unit for performing a pixel value adjustment process based on the image data stored in the memory; the data processing unit including:

a difference image data acquisition unit for subtracting, from a pixel value of the second image data, a pixel value of a corresponding pixel of the first image data, so as to acquire difference image data corresponding to an image captured in an irradiation environment of the first light source;

a difference image data pixel value adjustment unit for performing a white balance adjustment process on the difference image data;

a pixel value adding unit for adding a pixel value of pixels in the difference image data to corresponding pixel values of the first image data; and a final pixel value adjustment unit for performing pixel value adjustment with respect to image data generated in the pixel value adding unit, and generating the final pixel value adjustment image data.

14. The captured image data processing apparatus according to claim 13, wherein the data processing unit further includes a first image data pixel value adjustment unit for performing a pixel value adjustment process on the first image data.

15. The captured image data processing apparatus according to claim 14, wherein the difference image data pixel value adjustment unit is arranged to perform the white balance adjustment process according to a parameter based on a light component of the first light source; and the first image data pixel value adjustment unit is arranged to perform the white balance adjustment process according to a parameter based on an ambient light component not including the first light source.

16. The captured image data processing apparatus according to claim 13, characterized in that the difference image data pixel value adjustment unit performs the white balance adjustment process according to a parameter set based on ambient light component not including the first light source.

17. The captured image data processing apparatus according to claim 13, wherein the data processing unit includes:

a motion detection unit for detecting a moving portion of a subject based on difference data between a plurality of image data; and a moving portion pixel value adjustment unit for performing a pixel value adjustment process with respect to the moving portion.

18. The captured image data processing apparatus according to claim 17, wherein the moving portion pixel value adjustment unit further performs the steps of:

calculating a light intensity scalar ratio of two light sources when the first light source is caused or not caused to emit light, as data corresponding to a pixel of a motionless portion adjacent to a moving portion;

calculating light intensity scalar ratio corresponding to pixels of the moving portion by applying a radial basis function (RBF);

calculating a first pixel value of the pixels of the moving portion in an image which is equivalent to the captured image in an irradiation environment of only the first light source, based on light intensity scalar ratio corresponding to the pixels of the moving portion;

calculating a second pixel value of the pixels of the moving portion in an image which is equivalent to the captured image in an ambient light irradiation environment where the first light source is not included, based on light intensity scalar ratio corresponding to the pixels of the moving portion;

performing the pixel value adjustment process, based on the first pixel value;

performing the pixel value adjustment process based on the second pixel value; and adding the first and second adjustment pixel values to perform a moving portion pixel value adjustment process.

19. The captured image data processing apparatus according to claim 18 wherein the pixel value adjustment process performed based on the first pixel value is a white balance adjustment process according to a parameter set based on a light component of the first light source; and the pixel value adjustment process performed based on the second pixel value is a white balance adjustment process according to a parameter based on ambient light component not including the first light source.

20. The captured image data processing apparatus according to claim 17, wherein the moving portion pixel value adjustment unit is further performs the steps of:

calculating a color component ratio ($\alpha_r, \alpha_g, \alpha_b$) of the pixel value of an inner peripheral pixel of the moving portion to an average value of the pixel value of an outer peripheral pixel of the moving portion adjacent to the inner peripheral pixel of the moving portion;

constructing a radial basis function (RBF) based on the color component ratio corresponding to pixels by considering all the inner peripheral pixels in the moving portion as sample points;

calculating the color component ratio corresponding to pixels of the moving portion based on the radial basis function (RBF); and multiplying the color component ratio with an image to be compensated, and obtaining a compensation pixel value.

21. The captured image data processing apparatus according to claim 17, wherein the data processing unit is further performs the steps of:

performing the pixel value adjustment process based on the second image data acquired by way of an imaging process causing the first light source to emit light when a proportion of the whole image of the moving portion detected by the motion detection unit is higher than a predetermined threshold value, and the pixel value adjustment data based on the second image data is set as final pixel value adjustment data.

22. The captured image data processing apparatus according to claim 21, wherein the pixel value adjustment process based on the second image data performs either a white balance adjustment process according to the parameter set up based on the light component of the first light source, the white balance adjustment process according to the parameter set up based on ambient light component not including the first light source, or the white balance adjustment process according to the parameter set up based on an intermediate light component between the light component of the first light source and ambient light component not including the first light source.

23. A captured image data processing method comprising:

acquiring first image data by way of an imaging process causing a first light source not to emit light;

acquiring a second image data by way of an imaging process causing the first light source to emit light;

subtracting, from a pixel value of the second image data, a pixel value of a corresponding pixel of the first image data, and acquiring difference image data corresponding to an image captured in an irradiation environment of only the first light source;

performing a white balance adjustment process on the difference image data;

adding pixel values of pixels in the difference image data to corresponding pixel values of the first image data; and generating a final pixel value adjustment image based on the addition of the difference image data and the first image data.

24. A captured image data processing apparatus comprising:

an imaging means for acquiring a plurality of image data by way of an imaging process causing a first light source not to emit light and an imaging process causing the first light source to emit light;

a memory for storing first image data acquired by way of the imaging process causing the first light source not to emit light and a second image data acquired by way of the imaging process causing the first light source to emit light; and a data processing unit for performing a pixel value adjustment process based on the image data stored in the memory; wherein the data processing unit includes:

a difference image data acquisition unit for subtracting, from a pixel value of the second image data, a pixel value of a corresponding pixel of the first image data, so as to acquire difference image data corresponding to an image captured in an irradiation environment of the first light source;

a difference image data pixel value adjustment unit for performing a white balance adjustment process on the difference image data;

a pixel value adding unit for adding a pixel value of pixels in the difference image data to corresponding pixel values of the first image data; and a final pixel value adjustment unit for performing pixel value adjustment with respect to image data generated in the pixel value adding unit, and generating the final pixel value adjustment image data.

* * * * *

UNITED STATES PATENT AND TRADEMARK OFFICE
CERTIFICATE OF CORRECTION

PATENT NO. : 7,602,969 B2 Page 1 of 1
APPLICATION NO. : 10/521623
DATED : October 13, 2009
INVENTOR(S) : Rui Yamada et al.

It is certified that error appears in the above-identified patent and that said Letters Patent is hereby corrected as shown below:

* Title page, item (57), line 12 of ABSTRACT, "them Furthermore" should read --them. Furthermore--.

Claim 20, col. 44, line 7, "is further performs" should read --further performs--.

Claim 21, col. 44, lines 23-24, "is further performs" should read --further performs--.

Signed and Sealed this

Twenty-third Day of March, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,602,969 B2 | Page 1 of 1 |
| APPLICATION NO. | : 10/521623 | |
| DATED | : October 13, 2009 | |
| INVENTOR(S) | : Rui Yamada et al. | |

It is certified that error appears in the above-identified patent and that said Letters Patent is hereby corrected as shown below:

Title Page, (*) Notice: Subject to any disclaimer, the term of this patent is extended or adjusted under 35 U.S.C. 154(b) by 819 days.

should read (*) Notice: Subject to any disclaimer, the term of this patent is extended or adjusted under 35 U.S.C. 154(b) by 1,196 days.

Signed and Sealed this

Third Day of August, 2010

David J. Kappos
*Director of the United States Patent and Trademark Office*